(12) United States Patent
Zhang

(10) Patent No.: US 12,413,976 B2
(45) Date of Patent: Sep. 9, 2025

(54) BLE MESH DEVICE PROVISIONING METHOD, APPARATUS, AND DEVICE

(71) Applicant: GUANGDONG OPPO MOBILE TELECOMMUNICATIONS CORP., LTD., Dongguan (CN)

(72) Inventor: Jun Zhang, Dongguan (CN)

(73) Assignee: GUANGDONG OPPO MOBILE TELECOMMUNICATIONS CORP., LTD., Dongguan (CN)

(*) Notice: Subject to any disclaimer, the term of this patent is extended or adjusted under 35 U.S.C. 154(b) by 239 days.

(21) Appl. No.: 18/089,229

(22) Filed: Dec. 27, 2022

(65) Prior Publication Data
US 2023/0135800 A1 May 4, 2023

Related U.S. Application Data

(63) Continuation of application No. PCT/CN2020/103629, filed on Jul. 22, 2020.

(51) Int. Cl.
H04W 12/08 (2021.01)
H04W 4/80 (2018.01)
H04W 12/037 (2021.01)

(52) U.S. Cl.
CPC .......... H04W 12/08 (2013.01); H04W 4/80 (2018.02); H04W 12/037 (2021.01)

(58) Field of Classification Search
CPC ..... H04W 12/037; H04W 4/50; H04W 12/50; H04W 4/80; H04W 12/08; H04W 4/70; Y02D 30/70
See application file for complete search history.

(56) References Cited

U.S. PATENT DOCUMENTS 11,259,178 B2 * 2/2022 Hu ................ H04W 12/06
2015/0245204 A1 * 8/2015 Heydon .............. G06F 21/44
713/171

(Continued)

FOREIGN PATENT DOCUMENTS

CN 108366362 A 8/2018
CN 109089298 A 12/2018

(Continued)

OTHER PUBLICATIONS

International Search Report and Written Opinion dated Mar. 12, 2021 in International Application No. PCT/CN2020/103629. English translation attached.

(Continued)

Primary Examiner — Mohammad A Siddiqi
(74) Attorney, Agent, or Firm — Sheppard, Mullin, Richter & Hampton LLP

(57) ABSTRACT

The present disclosure relates communication technology and provides a BLE Mesh device provisioning method, apparatus, and device. The method includes: a BLE Mesh device calculating a first provisioning authorization value based on authorization reference information; the BLE Mesh device performing security verification with a provisioner using the first provisioning authorization value; the provisioner determining a second provisioning authorization value; the provisioner performing security verification with the BLE Mesh device using the second provisioning authorization value; the provisioner transmitting provisioning data to the BLE Mesh device when the security verification succeeds; and the BLE Mesh device receiving the provisioning data from the provisioner when the security verification succeeds. The embodiment of the present disclosure ensures proper binding between the BLE Mesh device and (Continued)

its corresponding provisioner by strongly associating the provisioning authorization value with the BLE Mesh device.

18 Claims, 14 Drawing Sheets

(56) References Cited

U.S. PATENT DOCUMENTS

| | | | |
|---|---|---|---|
| 2017/0092034 A1* | 3/2017 | Want | G06Q 20/18 |
| 2017/0171754 A1* | 6/2017 | South | H04W 12/06 |
| 2019/0357043 A1* | 11/2019 | Hu | H04L 9/0869 |
| 2019/0394209 A1* | 12/2019 | Urabe | G01S 5/12 |

FOREIGN PATENT DOCUMENTS

| | | |
|---|---|---|
| CN | 110505606 A | 11/2019 |
| WO | 2020039382 A1 | 2/2020 |

OTHER PUBLICATIONS

Robin Heydon et al. "Mesh Profile / Bluetooth Specification" V1.0.1 Mesh Working Group, Jan. 21, 2019(Jan. 21, 2019).

* cited by examiner

BLE Mesh Device 170

Provisioner 180

IoT Cloud Platform 190

BLE MESH DEVICE PROVISIONING METHOD, APPARATUS, AND DEVICE

CROSS-REFERENCE TO RELATED APPLICATION

The present application is a continuation of and claims priority to International Patent Application No. PCT/CN2020/103629, filed Jul. 22, 2020 and titled "BLE MESH DEVICE NETWORK ACCESS CONFIGURATION METHOD AND APPARATUS, AND DEVICE," which is incorporated herein by reference in its entirety.

TECHNICAL FIELD

The present disclosure relates to Internet of Things (IoT) technology, and more particularly, to a BLE Mesh device provisioning method, apparatus, and device.

RELATED ART

Compared with the earlier classic Bluetooth, Bluetooth Low Energy (BLE) can greatly reduce power consumption of devices and has been widely used.

BLE mesh network (Mesh) is a network designed to support communication between a large number of nodes. Its goal is to establish a trusted and secured network, with fully interoperable operations and mature ecosystems to support industry-level applications, and support networking between a large number of nodes. The BLE Mesh operates in a Managed Flood (Managed Flood Message Propagation) mode, which makes message propagation highly reliable and easy to extend, with performance that can satisfy commercial and industrial markets. In a BLE Mesh IoT system, a BLE Mesh device (New Device) to be connected to the network can be provisioned by a provisioner (Provisioner). In the related art, in order to improve the provisioning efficiency of a BLE Mesh device, a static Out of Band (OOB) or no-OOB verification scheme is adopted. Here, the static OOB refers to OOB verification based on static OOB information, and no-OOB refers to OOB verification based on a value 0 instead of OOB information. In the static OOB verification and no-OOB verification schemes, a provisioning authorization value (AuthValue) is a predetermined value, and the network access process of the BLE Mesh device can be completed without operations such as user input. In order to achieve the purpose of security verification, in the related art, the provisioner and the BLE Mesh device to be connected to the network calculate their respective provisioning confirmation values (Confirmation) based on the provisioning authorization value, and then exchange their calculated provisioning confirmation values and generated random values (Random). Taking the provisioner as an example, on one hand, it calculates a provisioning confirmation value based on the provisioning authorization value and the random value generated by itself, and transmits the provisioning confirmation value and the generated random value to the BLE Mesh device. On the other hand, it calculates a provisioning confirmation value based on the provisioning authorization value and the random value generated by the BLE Mesh device as obtained by exchange, and compares the calculated provisioning confirmation value with the provisioning confirmation value obtained by exchange. If they are the same, it passes the OOB verification and can then be bound to the BLE Mesh device for controlling the BLE Mesh device.

However, since the BLE Mesh device will broadcast its corresponding identification information, which contains the random value generated by the BLE Mesh device, as long as the BLE Mesh device is within the scanning range of a provisioner, the provisioner can obtain the identification information of the BLE Mesh device. Further, based on the provisioning authorization value and the random value contained in the identification information of the BLE Mesh device, the provisioner can calculate the provisioning confirmation value that is the same as the provisioning confirmation value calculated by the BLE Mesh device, so as to control the BLE Mesh device. Since any provisioner having a scanning range that includes a BLE Mesh device can control the BLE Mesh device, the BLE Mesh device may be bound by other users, which causes a serious threat to the security of the BLE Mesh device and is harmful to the protection of user privacy.

SUMMARY

Embodiments of the present disclosure provide a BLE Mesh device provisioning method, apparatus, and device. The technical solutions are as follows.

In an aspect, an embodiment of the present disclosure provides a BLE Mesh device provisioning method. The method is applied in a BLE Mesh device. The method includes: calculating a first provisioning authorization value based on authorization reference information including identification information of the BLE Mesh device; performing security verification with a provisioner using the first provisioning authorization value; and receiving, when the security verification succeeds, provisioning data from the provisioner, the provisioning data being used for provisioning the BLE Mesh device.

In another aspect, an embodiment of the present disclosure provides a BLE Mesh device provisioning method. The method is applied in a provisioner. The method includes: determining a second provisioning authorization value, the second provisioning authorization value being obtained based on authorization reference information including identification information of a BLE Mesh device; performing security verification with the BLE Mesh device using the second provisioning authorization value; and transmitting, when the security verification succeeds, provisioning data to the BLE Mesh device, the provisioning data being used for provisioning the BLE Mesh device.

In another aspect, an embodiment of the present disclosure provides a BLE Mesh device provisioning method. The method is applied in an Internet of Things (IoT) cloud platform. The method includes: receiving identification information of a BLE Mesh device; calculating a second provisioning authorization value based on authorization reference information including the identification information of the BLE Mesh device; and transmitting the second provisioning authorization value to the provisioner, the second provisioning authorization value being used for security verification between the BLE Mesh device and the provisioner.

In another aspect, an embodiment of the present disclosure provides a BLE Mesh device provisioning apparatus. The apparatus is provided in a BLE Mesh device. The apparatus includes: a first authorization value calculating module configured to calculate a first provisioning authorization value based on authorization reference information including identification information of the BLE Mesh device; a verifying module configured to perform security verification with a provisioner using the first provisioning authorization value; and a provisioning data receiving module configured to receive, when the security verification succeeds, provisioning data from the provisioner, the provisioning data being used for provisioning the BLE Mesh device.

In another aspect, an embodiment of the present disclosure provides a BLE Mesh device provisioning apparatus. The apparatus is provided in a provisioner. The apparatus includes: a second authorization value determining module configured to determine a second provisioning authorization value, the second provisioning authorization value being obtained based on authorization reference information including identification information of a BLE Mesh device; a verifying module configured to perform security verification with the BLE Mesh device using the second provisioning authorization value; and a provisioning data transmitting module configured to transmit, when the security verification succeeds, provisioning data to the BLE Mesh device, the provisioning data being used for provisioning the BLE Mesh device.

In another aspect, an embodiment of the present disclosure provides a BLE Mesh device provisioning apparatus. The apparatus is provided in an IoT cloud platform. The apparatus includes: an identification information receiving module configured to receive identification information of a BLE Mesh device; a second authorization value calculating module configured to calculate a second provisioning authorization value based on authorization reference information including the identification information of the BLE Mesh device; and a second authorization value transmitting module configured to transmit the second provisioning authorization value to the provisioner, the second provisioning authorization value being used for security verification between the BLE Mesh device and the provisioner.

In another aspect, an embodiment of the present disclosure provides a BLE Mesh device. The BLE Mesh device includes: a processor and a transceiver connected to the processor. The processor is configured to calculate a first provisioning authorization value based on authorization reference information including identification information of the BLE Mesh device. The processor is further configured to perform security verification with the provisioner using the first provisioning authorization value. The transceiver is configured to receive, when the security verification succeeds, provisioning data from the provisioner, the provisioning data being used for provisioning the BLE Mesh device.

In another aspect, an embodiment of the present disclosure provides a provisioner. The provisioner includes a processor and a transceiver connected to the processor. The processor is configured to determine a second provisioning authorization value, the second provisioning authorization value being obtained based on authorization reference information including identification information of a BLE Mesh device. The processor is further configured to perform security verification with the BLE Mesh device using the second provisioning authorization value. The transceiver is configured to transmit, when the security verification succeeds, provisioning data to the BLE Mesh device, the provisioning data being used for provisioning the BLE Mesh device.

In another aspect, an embodiment of the present disclosure provides an IoT cloud platform. The IoT cloud platform includes: a processor and a transceiver connected to the processor. The transceiver is configured to receive identification information of a BLE Mesh device. The processor is configured to calculate a second provisioning authorization value based on authorization reference information including the identification information of the BLE Mesh device. The transceiver is configured to transmit the second provisioning authorization value to the provisioner, the second provisioning authorization value being used for security verification between the BLE Mesh device and the provisioner.

In another aspect, an embodiment of the present disclosure provides a computer-readable storage medium. The computer-readable storage medium has a computer program stored therein. The computer program is configured to be executed by a processor in a BLE Mesh device to perform the above BLE Mesh device provisioning method at the BLE Mesh device.

In another aspect, an embodiment of the present disclosure provides a computer-readable storage medium. The computer-readable storage medium has a computer program stored therein. The computer program is configured to be executed by a processor in a provisioner to perform the above BLE Mesh device provisioning method at the provisioner.

In another aspect, an embodiment of the present disclosure provides a computer-readable storage medium. The computer-readable storage medium has a computer program stored therein. The computer program is configured to be executed by a processor in an IoT cloud platform to perform the above BLE Mesh device provisioning method at the IoT cloud platform.

In another aspect, an embodiment of the present disclosure provides a chip. The chip includes a programmable logic circuit and/or program instructions. When the chip runs on a BLE Mesh device, it is configured to perform the above BLE Mesh device provisioning method at the BLE Mesh device.

In another aspect, an embodiment of the present disclosure provides a chip. The chip includes a programmable logic circuit and/or program instructions. When the chip runs on a provisioner, it is configured to perform the above BLE Mesh device provisioning method at the provisioner.

In another aspect, an embodiment of the present disclosure provides a chip. The chip includes a programmable logic circuit and/or program instructions. When the chip runs on an IoT cloud platform, it is configured to perform the above BLE Mesh device provisioning method at the IoT cloud platform.

In another aspect, an embodiment of the present disclosure provides a computer program product. When the computer program product runs on a BLE Mesh device, it causes a computer to perform the above BLE Mesh device provisioning method at the BLE Mesh device.

In another aspect, an embodiment of the present disclosure provides a computer program product. When the computer program product runs on a provisioner, it causes a computer to perform the above BLE Mesh device provisioning method at the provisioner.

In another aspect, an embodiment of the present disclosure provides a computer program product. When the computer program product runs on an IoT cloud platform, it causes a computer to perform the above BLE Mesh device provisioning method at the IoT cloud platform.

The technical solutions according to the embodiments of the present disclosure may include the following advantageous effects.

BRIEF DESCRIPTION OF THE DRAWINGS

In order to describe the technical solutions in the embodiments of the present disclosure more clearly, the drawings to be used in the description of the embodiments will be briefly introduced below. Obviously, the drawings in the following description are only some embodiments of the present disclosure, and other drawings can be obtained by those of ordinary skill in the art based on these drawings without any inventive efforts.

DETAILED DESCRIPTION

The embodiments of the present disclosure will be further described in detail below with reference to the accompanying drawings, such that the objects, technical solutions, and advantages of the present disclosure will become more apparent.

Figure 1:
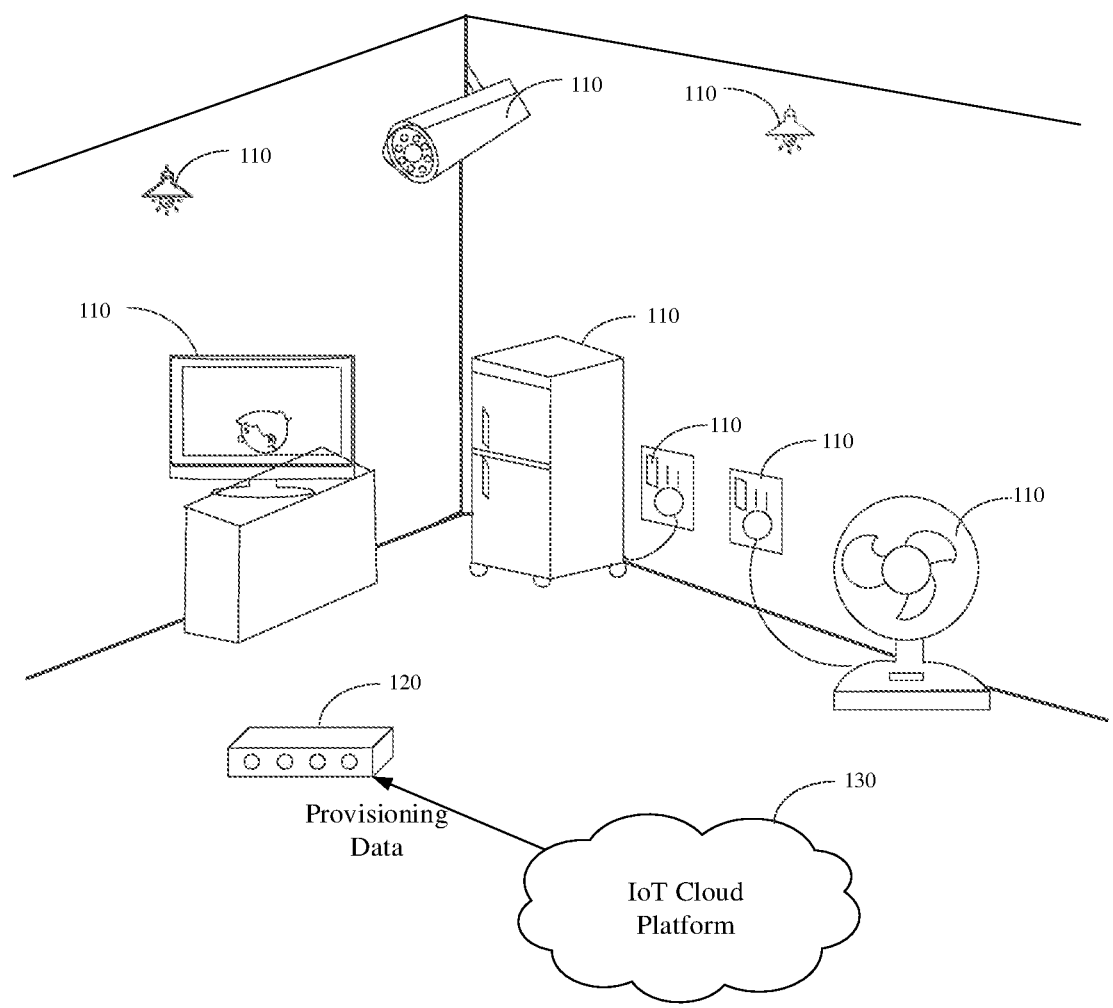
FIG. 1 is a schematic diagram showing a BLE Mesh device provisioning system according to an embodiment of the present disclosure.

Referring to FIG. 1, which is a schematic diagram showing a BLE Mesh device provisioning system according to an embodiment of the present disclosure. The provisioning system may include BLE Mesh devices 110 and a provisioner 120.

The BLE Mesh device 110 refers to a device with network access capability in a BLE Mesh networking. In at least one embodiment, the BLE Mesh device 110 may be a smart home device, terminal device, or other device with network access capability. The embodiment of the present disclosure is not limited to this. In an example, as shown in FIG. 1, when BLE Mesh networking is applied in a smart home, the BLE Mesh device 110 can be a smart home device such as smart TV, smart speaker, smart air conditioner, smart light, smart door/window, smart curtain, smart socket, or the like. In at least one embodiment, there may be one or more BLE Mesh devices 110, and the embodiment of the present disclosure is not limited to this. In practice, the number of BLE Mesh devices 110 may be determined based on an application requirement or a maximum number of nodes that can be included in a mesh network.

The provisioner 120 refers to a device capable of provisioning. In at least one embodiment, the provisioner 120 may be a server, terminal device, router, or other device capable of provisioning. In practice, the implementation form of the provisioner 120 can be determined in combination with the application scenario of BLE Mesh networking. In an example, as shown in FIG. 1, when BLE Mesh networking is applied in a smart home, which is an environment having characteristics such as small area and frequent activities, it will affect the normal home life to use the provisioner 120 that occupies a large space, and the provisioner 120 can be implemented as a router or a terminal. In at least one embodiment, for a certain BLE Mesh networking, there may be one or more provisioners corresponding to the BLE Mesh networking, and the embodiment of the present disclosure is not limited to this. Generally, for the purpose of resource saving for example, there may be one provisioner corresponding to a BLE Mesh networking. In at least one embodiment, different provisioners may correspond to different BLE Mesh networkings, such that a BLE Mesh device 110 corresponding to a certain BLE Mesh networking is bound to a provisioner 120 in the BLE Mesh networking.

In an embodiment of the present disclosure, the provisioner 120 can provision the BLE Mesh device 110 to join the BLE Mesh networking (hereinafter referred to as "provision the BLE Mesh device"), such that the BLE Mesh device 110 can become a node in the BLE Mesh networking, and it can communicate with other nodes in the BLE Mesh networking. The embodiment of the present disclosure is not limited to any communication mode between nodes in the BLE Mesh networking. In at least one embodiment, the nodes may communicate with each other by means of broadcast, or the nodes may communicate with each other in a point-to-point manner. In at least one embodiment, during the process of provisioning the BLE Mesh device 110, the provisioner 120 may perform OOB verification with the BLE Mesh device 110, so as to achieve the purpose of security verification. If the OOB verification succeeds, provisioning data is transmitted to the BLE Mesh device 110. In at least one embodiment, the provisioning data may include at least one of: an address of the BLE Mesh network, or a key for communication information encryption.

In an example, the BLE Mesh device provisioning system according to an embodiment of the present disclosure may further include an IoT cloud platform 130. The IoT cloud platform 130 is configured to generate provisioning data for the BLE Mesh device 110, and transmit the provisioning data for the BLE Mesh device 110 to the provisioner 120, such that the provisioner 120 can transmit the provisioning data to the BLE Mesh device 110 when the OOB verification between the provisioner 120 and the BLE Mesh device 110 succeeds. In at least one embodiment, the IoT cloud platform 130 can be connected to provisioners corresponding to a plurality of BLE Mesh networkings. In FIG. 1, the IoT cloud platform 130 is connected to a provisioner 120 corresponding to a BLE Mesh networking as an example for the purpose of illustration, but the technical solution of the present disclosure is not limited to this.

Figure 2:
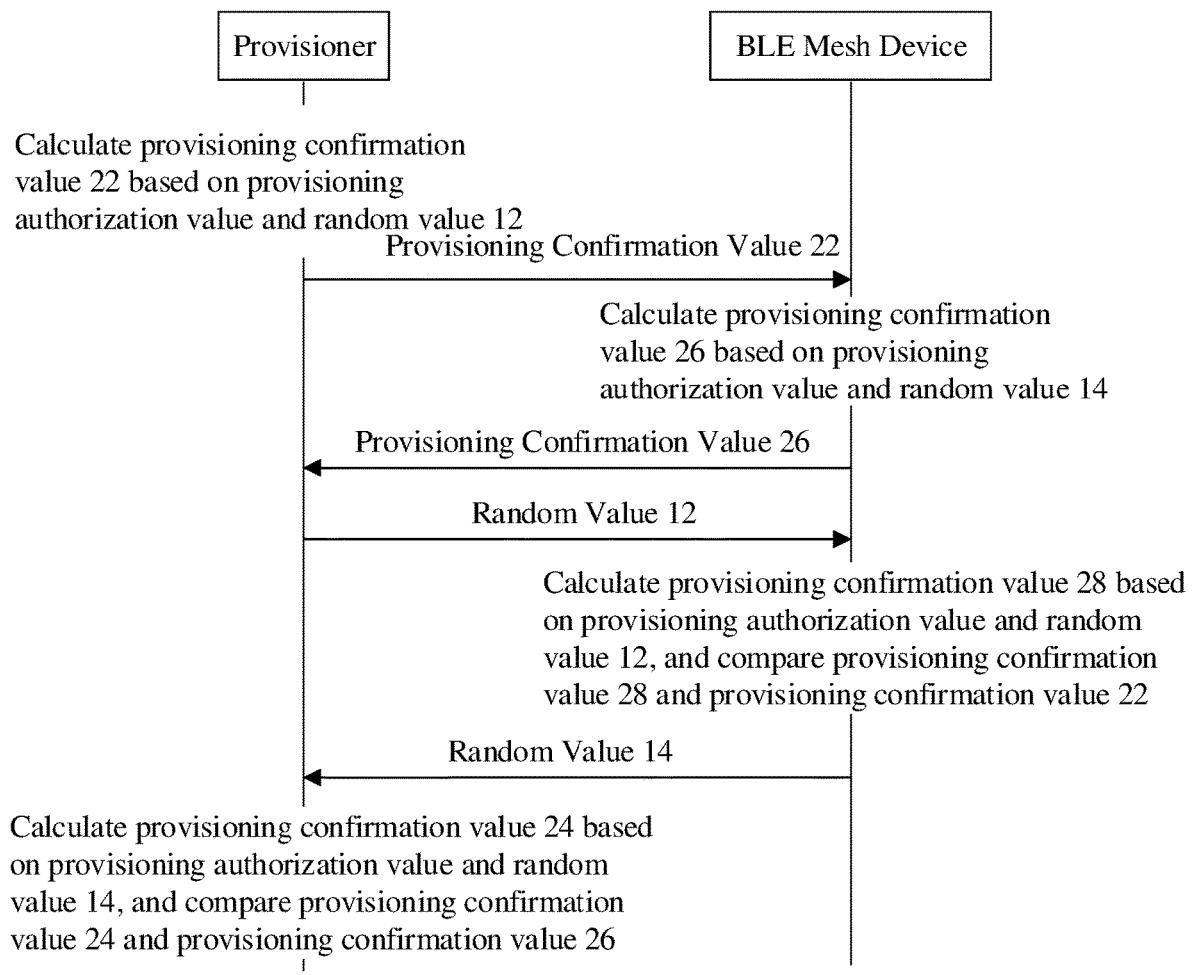
FIG. 2 is the flowchart of OOB verification according to an embodiment of the present disclosure.

It can be seen from the above description that in order to achieve the purpose of security verification during the provisioning process, the provisioner and the BLE Mesh device can calculate their respective provisioning confirmation values, and exchange their calculated provisioning confirmation values and generated random values. Referring to FIG. 2, at the provisioner, on one hand, it calculates a provisioning confirmation value 22 based on the provisioning authorization value and a random value 12 generated by itself, and transmits the provisioning confirmation value 22 and the generated random value 12 to the BLE Mesh device. On the other hand, it calculates a provisioning confirmation value 24 based on the provisioning authorization value and a random value 14 generated by the BLE Mesh device as obtained by exchange, and compares the calculated provisioning confirmation value 24 with a provisioning confirmation value 26 obtained by exchange. If they are the same, then OOB verification succeeds, and then provisioning data can be transmitted to the BLE Mesh device for binding with the BLE Mesh device. At the BLE Mesh device, on one hand, it calculates the provisioning confirmation value 26 based on the provisioning authorization value and the random value 14 generated by itself, and transmits the provisioning confirmation value 26 and the generated random value 14 to the provisioner. On the other hand, it calculates a provisioning confirmation value 28 based on the provisioning authorization value and the random value 12 generated by the provisioner as obtained by exchange, and compares the calculated provisioning confirmation value 28 with the provisioning confirmation value 22 obtained by exchange. If they are the same, the OOB verification succeeds, and then the provisioning data transmitted by the provisioner can be received for binding with the provisioner.

It is to be noted that the embodiment of the present disclosure is not limited to the sequence of operations at the BLE Mesh device and the provisioner to calculate the respective provisioning confirmation values. In at least one embodiment, the BLE Mesh device and the provisioner calculate their respective provisioning confirmation values at the same time. It is also to be noted that the embodiment of the present disclosure is not limited to the sequence of operations at the BLE Mesh device and the provisioner to verify the exchanged provisioning confirmation values. In at least one embodiment, the provisioner may verify the provisioning confirmation value of the BLE Mesh device first, and then if the verification succeeds, the BLE Mesh device may verify the provisioning confirmation value of the provisioner. Alternatively, the BLE Mesh device may verify the provisioning confirmation value of the provisioner first, and then if the verification succeeds, the provisioner may verify the provisioning confirmation of the BLE Mesh device. In FIG. 2, the provisioning confirmation value of the BLE Mesh device is first verified by the provisioner as an example for the purpose of illustration, but the technical solution of the present disclosure is not limited to this. It is also to be noted that the provisioner can transmit the provisioning confirmation value 22 and the random value 12 to the BLE Mesh device together or separately. Similarly, the BLE Mesh device can transmit the provisioning confirmation value 26 and the random value 14 to the provisioner together or separately, but the embodiment of the present disclosure is not limited to this.

Exemplarily, the BLE Mesh device 110 may calculate its own provisioning confirmation value according to:

$$\text{ConfirmationDevice} = \text{AES-CMAC}_{ConfirmationKey}(\text{RandomDevice} \| \text{AuthValue}),$$

where AES (Advanced Encryption Standard)-CMAC (Cypher-Based Message Verification Code) refers to an encryption algorithm for message verification based on a symmetric encryption method of AES; AES-CMAC$_{ConfirmationKey}$ refers to an encryption key calculated based on the key ConfirmationKey and the encryption algorithm AES-CMAC (for calculation of the key ConfirmationKey, reference can be made to the embodiments below and details will be omitted here); "$\|$" is a connector, RandomDevice refers to the random value generated by the BLE Mesh device, AuthValue is the provisioning authorization value, and "RandomDevice$\|$AuthValue" denotes a concatenation of the provisioning authorization value and the random value generated by the BLE Mesh device; and ConfirmationDevice refers to the provisioning confirmation value of the BLE Mesh device.

Exemplarily, the provisioner 120 may calculate its own provisioning confirmation value according to:

$$\text{ConfirmationProvisioner} = \text{AES-CMAC}_{ConfirmationKey}(\text{RandomProvisioner} \| \text{AuthValue}),$$

where RandomProvisioner is the random value generated by the provisioner, and ConfirmationProvisioner is the provisioning confirmation value of the provisioner.

In the above two examples of calculating the provisioning confirmation values, ConfirmationKey can be obtained according to:

$$\text{ConfirmationKey} = k1(\text{ECDHSecret}, \text{ConfirmationSalt}, \text{"prck"});$$

$$\text{ConfirmationSalt} = s1(\text{ConfirmationInputs});$$

$$\text{ConfirmationInputs} = \text{ProvisioningInvitePDUValue} \| \\ \text{ProvisioningCapabilitiesPDUValue} \| \text{ProvisioningStartPDUValue} \| \text{PublicKeyProvisioner} \| \text{PublicKeyDevice},$$

where "k1" and "s1" are encryption algorithms; "PublicKeyDevice" is a public key of the BLE Mesh device; and "PublicKeyProvisioner" is a public key of the provisioner.

In the related art, in order to improve the provisioning efficiency of a BLE Mesh device, a static OOB or no-OOB verification scheme is adopted. Here, the static OOB refers to OOB verification based on static OOB information, and no-OOB refers to OOB verification based on a value 0 instead of OOB information. In the static OOB verification and no-OOB verification schemes, a provisioning authorization value is a predetermined value, and the network access process of the BLE Mesh device can be completed without operations such as user input.

However, since the BLE Mesh device will broadcast its corresponding identification information, which contains the random value generated by the BLE Mesh device, as long as the BLE Mesh device is within the scanning range of a provisioner, the provisioner can obtain the identification information of the BLE Mesh device. Further, based on the provisioning authorization value and the random value contained in the identification information of the BLE Mesh device, the provisioner can calculate the provisioning confirmation value that is the same as the provisioning confirmation value calculated by the BLE Mesh device, so as to control the BLE Mesh device.

Figure 3:
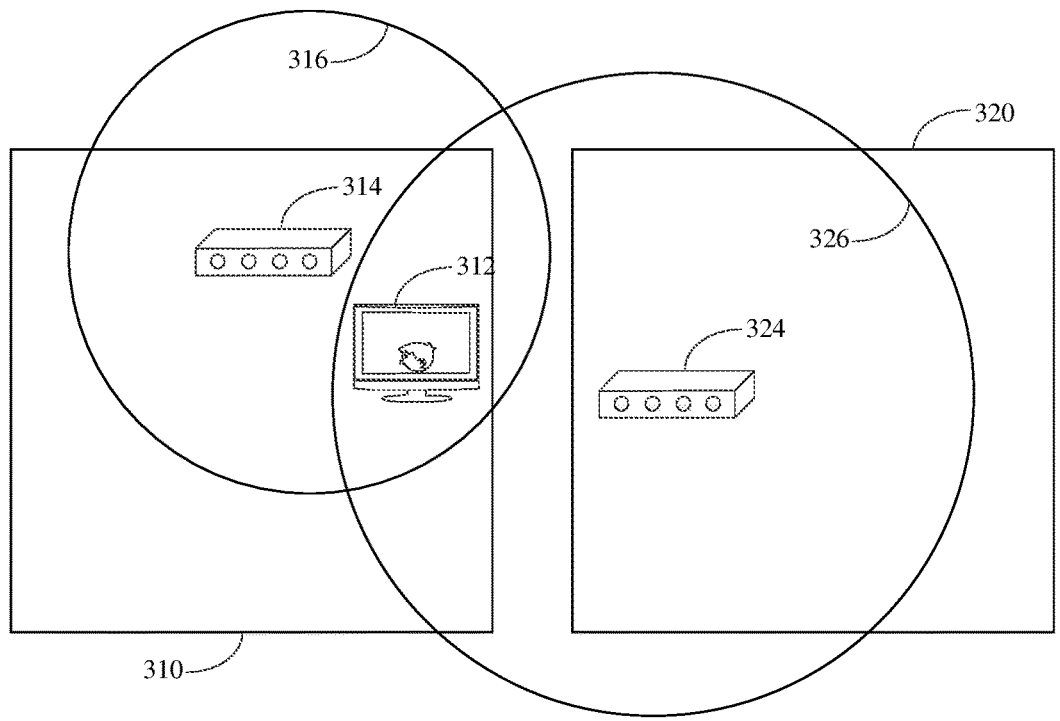
FIG. 3 is a schematic diagram showing a scanning range of a provisioner according to an embodiment of the present disclosure.

For example, as shown in FIG. 3, a BLE Mesh device 312 in a BLE Mesh networking 310 broadcasts identification information, which includes a random value generated by the BLE Mesh device 312. It is assumed that the BLE Mesh device 312 is located in both a scanning range 316 of a provisioner 314 in the BLE Mesh networking 310 and a scanning range 326 of a provisioner 324 in a BLE Mesh networking 320, then the provisioner 324 can also detect the random value generated by the BLE Mesh device 312. Further, due to the static OOB verification and no-OOB verification schemes, the provisioner 324 can also calculate the same provisioning authorization value as the BLE Mesh device 312, and thus the BLE Mesh device 312 may be bound to the provisioner 324 instead of the provisioner 314. It should be noted that in FIG. 3 the BLE Mesh networkings are represented as square areas and the scanning ranges of the provisioner 314 and the provisioner 324 are represented as circular areas only for the purpose of description, and the technical solution of the present disclosure is not limited to this.

Since any provisioner having a scanning range that includes a BLE Mesh device can control the BLE Mesh device, the BLE Mesh device may be bound by other users, which causes a serious threat to the security of the BLE Mesh device and is harmful to the protection of user privacy. In view of this, the embodiments of the present disclosure provide a BLE Mesh device provisioning method, capable of solving the above technical problems. Hereinafter, the technical solutions of the present disclosure will be introduced and described with reference to several exemplary embodiments.

Figure 4:
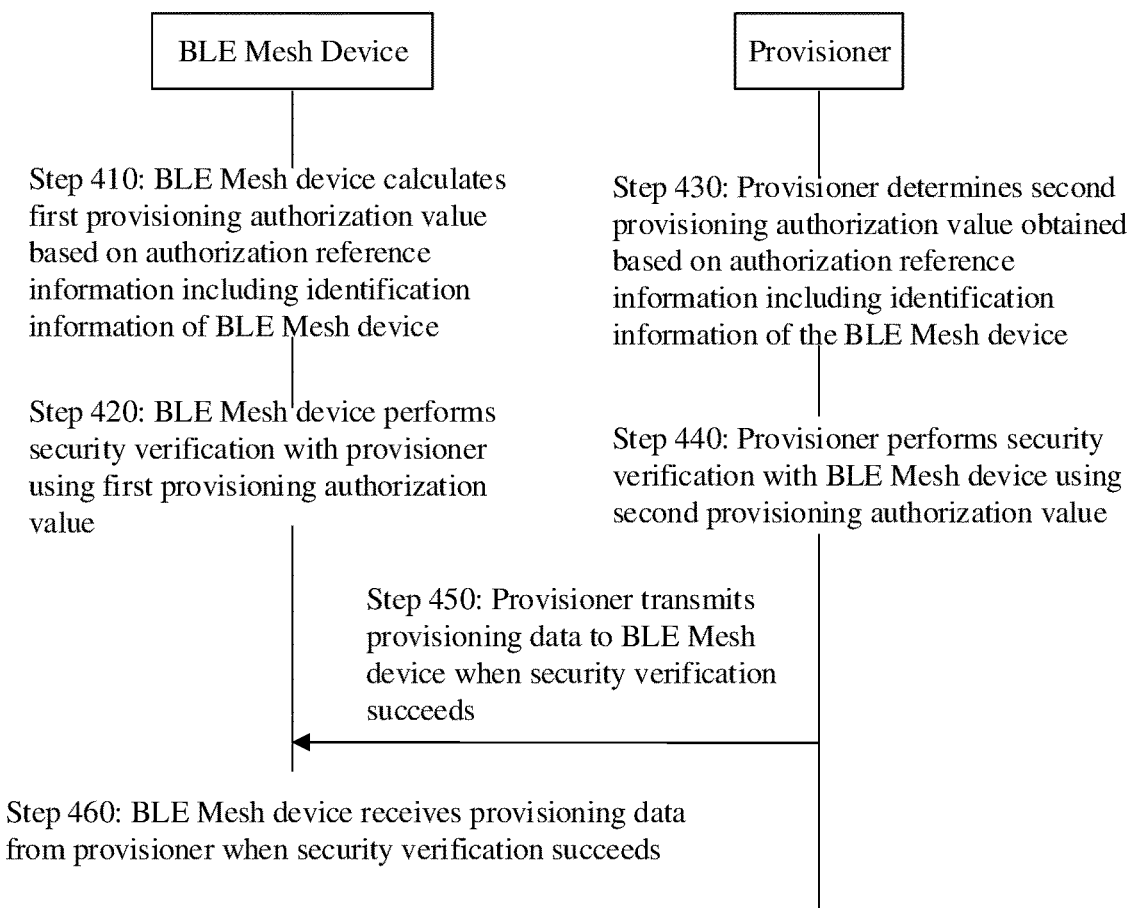
FIG. 4 is a flowchart illustrating a BLE Mesh device provisioning method according to an embodiment of the present disclosure.

Referring to FIG. 4, which is a flowchart illustrating a BLE Mesh device provisioning method according to an embodiment of the present disclosure, the method can be applied in the provisioning system shown in FIG. 1. The method may include the following steps.

At Step 410, a BLE Mesh device calculates a first provisioning authorization value based on authorization reference information including identification information of the BLE Mesh device.

The authorization reference information is reference information used in the process of calculating the provisioning authorization value. In an embodiment of the present disclosure, the authorization reference information includes identification information of the BLE Mesh device, which is information identifying the BLE Mesh device. Typically, different BLE Mesh devices correspond to different identification information. Since the BLE Mesh device in the embodiment of the present disclosure has not been provisioned to join the BLE Mesh networking, the BLE Mesh device needs to broadcast an unprovisioned device beacon message to indicate that it has not been provisioned to join the BLE Mesh networking. In at least one embodiment, the unprovisioned device beacon message of the BLE Mesh device may include the identification information of the BLE Mesh device.

Figure 20:
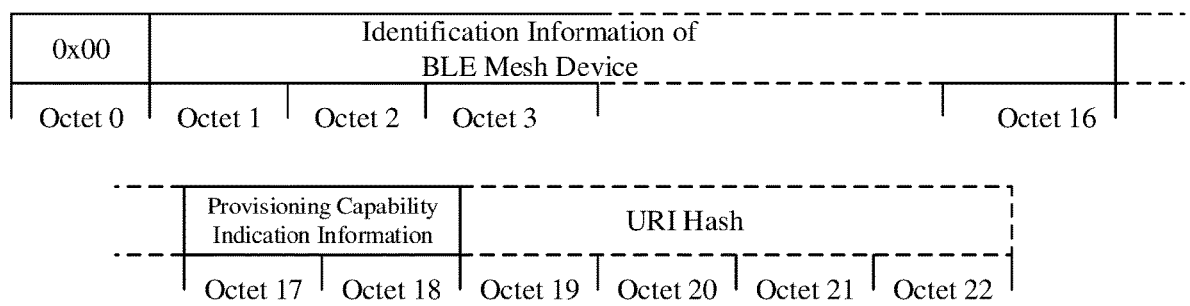
FIG. 20 is a schematic diagram showing a format of an unprovisioned device beacon message of a BLE Mesh device according to an embodiment of the present disclosure.

Referring to FIG. 20, which is a schematic diagram showing a format of an unprovisioned device beacon message of a BLE Mesh device according to an embodiment of the present disclosure. In FIG. 20, the unprovisioned beacon message may include the identification information of the BLE Mesh device (Device Universally Unique Identifier (UUID)), provisioning capability indication information, and a Hash value of a Uniform Resource Identifier (URI). Here, the identification information of the BLE Mesh device can be defined by the manufacturer of the BLE Mesh device. Table 1 below shows a format of the identification information of the BLE Mesh device.

TABLE 1

Example of Format of Identification
Information of BLE Mesh Device

| Field | No. of Octets | Notes |
| --- | --- | --- |
| Cid (Company Identifier) | 2 | Company Identifier |
| Did (Device Identifier) | 6 | Unique Device Identifier |
| Provisioning Random Value | 4 | Random value generated in provisioning |
| RFU (Reserved for Future Use) | 4 | Reserved for Future Use |

As can be seen from Table 1 above, the identification information of the BLE Mesh device includes four items: Cid, Did, provisioning random value, and RFU. Here, the provisioning random value is randomly generated when the BLE Mesh device enters the provisioning mode, and is filled into the identification information of the BLE Mesh device. Different provisioning random values are generated by different BLE Mesh devices. In addition to the provisioning random value, since the Cid indicates the device manufacturer of the BLE Mesh device, different Cids correspond to BLE Mesh devices of different device manufacturers, and the same Cid corresponds to BLE Mesh devices of the same device manufacturer. Since the Did indicates the unique identifier of the BLE Mesh device, different Dids correspond to different BLE Mesh devices. It should be noted that the embodiment of the present disclosure is not limited to any specific content of the identification information of the BLE Mesh device. Table 1 only exemplarily shows a possible format of the identification information of the BLE Mesh device. In an example, the identification information of the BLE Mesh device may include at least one of: a provisioning random value generated by the BLE Mesh device, or a device identifier of the BLE Mesh device. In practice, some content may be added to or subtracted from Table 1 depending on requirements. For example, a Product Identifier (Pid) may be added to identify a device type of the BLE Mesh device, e.g., the device type may be a smart door lock; or a Bluetooth Media Access Control (MAC) Address can be added.

It can be seen from the above description that the provisioning random value generated by the BLE Mesh device can be filled into the identification information of the BLE Mesh device when the BLE Mesh device enters the provisioning mode. The embodiment of the present disclosure is not limited to any specific scheme of triggering the BLE Mesh device to enter the provisioning mode. In at least one embodiment, the BLE Mesh device may automatically enter the provisioning mode when it is turned on for the first time, or the BLE Mesh device may be passively triggered by a user to enter the provisioning mode.

After entering the provisioning mode and filling the provisioning random value into the identification information of the BLE Mesh device, the BLE Mesh device can calculate the provisioning authorization value at the BLE Mesh device, i.e., the first provisioning authorization value, based on the authorization reference information including the identification information of the BLE Mesh device. The embodiment of the present disclosure is not limited to any specific content of the authorization reference information. In at least one embodiment, the authorization reference information may include, in addition to the identification information of the BLE Mesh device, a security credential (Secret) of the BLE Mesh device. The security credentials corresponding to different BLE Mesh devices may be same or different, and the embodiment of the present disclosure is not limited to this. For the process of calculating the first provisioning authorization value, reference can be made to the following embodiments, and details thereof will be omitted here. Since different BLE Mesh devices have different identification information, by using the identification information of the BLE Mesh device as a basis for calculating the provisioning authorization value, different provisioning authorization values can be calculated for different BLE Mesh devices. Then the provisioning authorization value can be strongly associated with the BLE Mesh device, such that for a BLE Mesh device, the provisioning authorization value is unique. Therefore, security verification between the BLE Mesh device and the provisioner can be performed subsequently based on the provisioning authorization value.

At Step 420, the BLE Mesh device performs security verification with a provisioner using the first provisioning authorization value.

After the BLE Mesh device calculates the first provisioning authorization value, it can use the first provisioning authorization value to perform security verification with the provisioner. For the description of the security verification, reference can be made to the following embodiments, and details thereof will be omitted here.

In an embodiment of the present disclosure, the security verification refers to verifying the security of the BLE Mesh device and the provisioner. In an example, the security verification may be OOB verification or the security verification may include other verification schemes for verifying the security of the BLE Mesh device and the provisioner, and the embodiment of the present disclosure is not limited to this. It should be noted that, with the evolution of communication protocol, in the future communication protocol or future provisioning system, the "OOB verification" may be given a new name, but the meaning it expresses is security verification between the provisioner and the BLE Mesh device. Such new name should also be encompassed by the scope of the present disclosure. It should also be noted that the "security verification" mentioned elsewhere in the embodiment of the present disclosure may also be OOB verification, and details thereof will be omitted in the following embodiments.

At Step 430, the provisioner determines a second provisioning authorization value. The second provisioning authorization value is obtained based on the authorization reference information including identification information of the BLE Mesh device.

The provisioner may determine the second provisioning authorization value based on the authorization reference information including the identification information of the BLE Mesh device. The embodiment of the present disclosure is not limited to any specific manner in which the provisioner obtains the identification information of the BLE Mesh device. In at least one embodiment, before Step 430, the method may further include: the BLE Mesh device transmitting the identification information of the BLE Mesh device to the provisioner. That is, the BLE Mesh device transmits the identification information of the BLE Mesh device to the provisioner via point-to-point transmission.

Alternatively, before Step 430 above, the method may further include: the provisioner scanning for the identification information of the BLE Mesh device. That is, the BLE Mesh device broadcasts its corresponding identification information, and the provisioner can obtain the identification information of the BLE Mesh device by means of scanning. The embodiment of the present disclosure is not limited to any specific manner in which the provisioner determines the second provisioning authorization value. The provisioner can either calculate the second provisioning authorization value by itself, or obtain from the IoT cloud platform the second provisioning authorization value calculated by the IoT cloud platform. For the process in which the provisioner obtains the second provisioning authorization value, reference can be made to the following embodiments, and details thereof will be omitted here.

At Step 440, the provisioner performs security verification with the BLE Mesh device using the second provisioning authorization value.

After the provisioner calculates the first provisioning authorization value, it can use the first provisioning authorization value to perform security verification with the BLE Mesh device. For the description of the security verification, reference can be made to the following embodiments, and details thereof will be omitted here.

At Step 450, when the security verification succeeds, the provisioner transmits provisioning data to the BLE Mesh device.

When the security verification between the provisioner and the BLE Mesh device succeeds, the provisioner can transmit the provisioning data to the BLE Mesh device, and the provisioning data can be used to provision the BLE Mesh device. For the description of the provisioning data, reference can be made to the above method embodiments, and details thereof will be omitted here.

At Step 460, the BLE Mesh device receives the provisioning data from the provisioner when the security verification succeeds.

When the security verification between the BLE Mesh device and the provisioner succeeds, the BLE Mesh device can receive the provisioning data from the provisioner, and the provisioning data can be used to provision the BLE Mesh device. For the description of the provisioning data, reference can be made to the above method embodiments, and details thereof will be omitted here. In the embodiment of the present disclosure, bidirectional verification between the BLE Mesh device and the provisioner is performed, which fully ensures the security of the identities of both parties, avoids the possibility of one party's identity being insecure and user privacy being leaked due to unidirectional verification, and improves the security of the BLE Mesh device and the provisioner.

To summarize, with the technical solutions according to the embodiments of the present disclosure, the BLE Mesh device and the provisioner perform security verification according to their respective obtained provisioning authorization values. If the security verification succeeds, the provisioner provisions the BLE Mesh device. In the embodiment of the present disclosure, the provisioning authorization value is calculated based on the identification information of the BLE Mesh device. Since different BLE Mesh devices have different identification information, the identification information of the BLE Mesh device is used as a basis for calculation of the provisioning authorization value, such that different provisioning authorization values can be calculated for different BLE Mesh devices. Compared with the related art where the same provisioning authorization value is used for different BLE Mesh devices, which may cause the problem of wrong binding or invalid binding, the embodiment of the present disclosure strongly associates the provisioning authorization value with the BLE Mesh device, such that for a certain BLE Mesh device, the provisioning authorization value is unique, thereby ensuring proper binding between the BLE Mesh device and its corresponding provisioner. In addition, in the embodiment of the present disclosure, bidirectional verification is used for the security verification, which fully ensures the security of the identities of both parties, and improves the security of the BLE Mesh device and the provisioner.

In the following, the scheme in which the second provisioning authorization value is calculated by the IoT cloud platform will be described.

Figure 5:
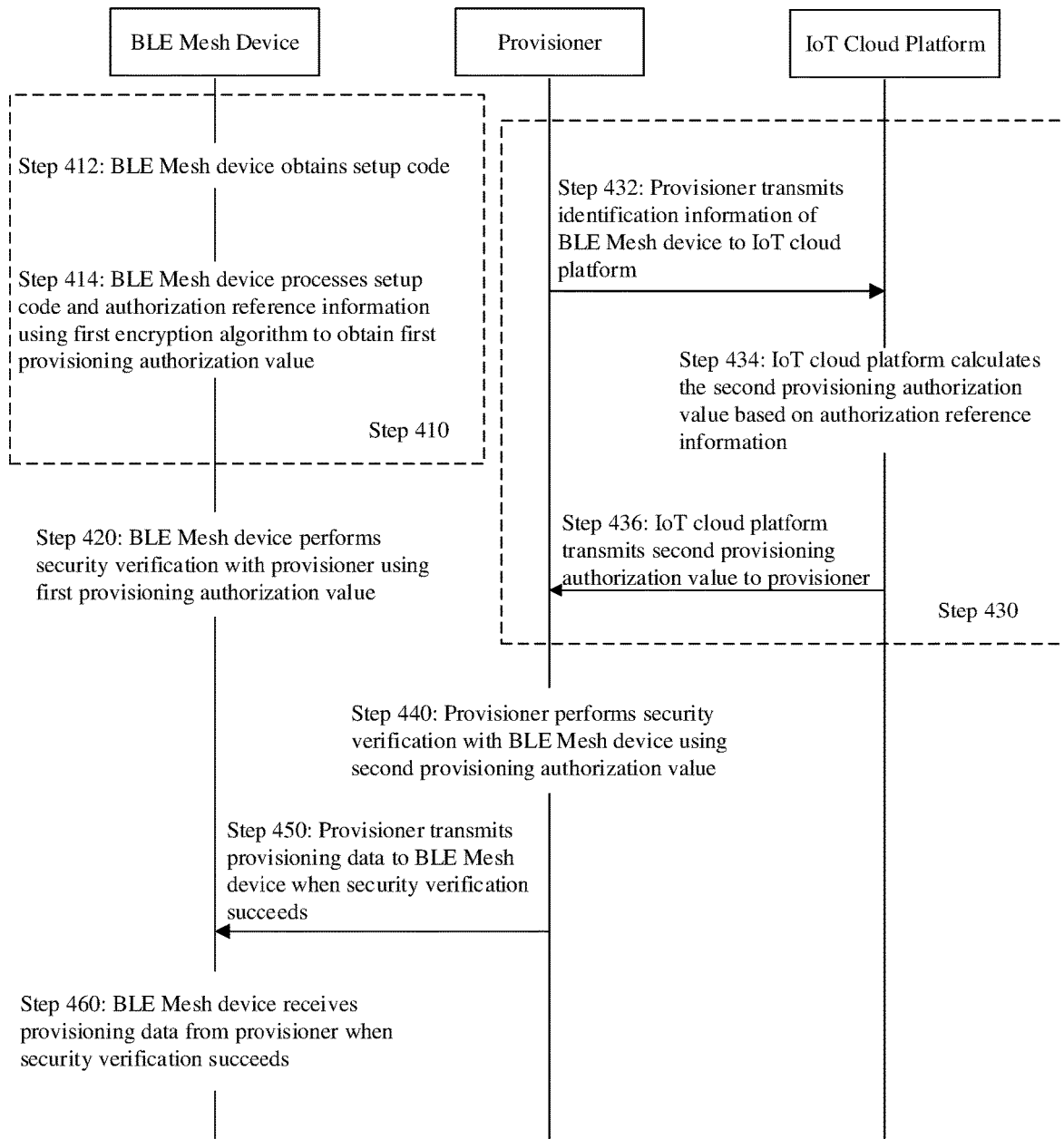
FIG. 5 is a flowchart of calculating a provisioning authorization value according to an embodiment of the present disclosure.

In an example, as shown in FIG. 5, the above Step 410 includes the following steps.

At Step 412, the BLE Mesh device obtains a setup code.

The BLE Mesh device can obtain the setup code (SetupCode). In at least one embodiment, the setup code can be a dynamic or static random value. The embodiment of the present disclosure is not limited to any specific scheme in which the BLE Mesh device obtains the setup code. In at least one embodiment, when a verification type of the security verification is output security verification, the setup code can be directly generated by the BLE Mesh device; or when the verification type of the security verification is input security verification and the setup code is a sound, the provisioner can output the sound, and then the BLE Mesh device can receive it to obtain the setup code. For the description of the setup code and the verification type of the security verification, reference can be made to the following embodiments, and details thereof will be omitted here.

At Step 414, the BLE Mesh device processes the setup code and the authorization reference information using a first encryption algorithm to obtain the first provisioning authorization value.

The BLE Mesh device can use the first encryption algorithm to process the setup code and the authorization reference information including the identification information of the BLE Mesh device to obtain the first provisioning authorization value. The embodiment of the present disclosure is not limited to any specific first encryption algorithm used by the BLE Mesh device. In at least one embodiment, the first encryption algorithm may be a Secure Hash Algorithm (SHA) 256 algorithm. When the identification information of the BLE Mesh device includes the provisioning random value generated by the BLE Mesh device and the device identifier of the BLE Mesh device, and the authorization reference information further includes the security credential of the BLE Mesh device, the first provisioning authorization value can be calculated as follows:

$$AuthValue=SHA256(Did,Random,Secret,SetupCode).$$

Corresponding to the above example, as shown in FIG. 5, the above Step 430 includes the following steps.

At Step 432, the provisioner transmits the identification information of the BLE Mesh device to the IoT cloud platform.

It can be seen from the above description that the provisioner can obtain the second provisioning authorization value calculated by the IoT cloud platform from the IoT cloud platform. In order to ensure that the first provisioning authorization value calculated by the BLE Mesh device is consistent with the second provisioning authorization value calculated by the IoT cloud platform, in an embodiment of the present disclosure, the BLE Mesh device and the IoT cloud platform shall use the same authorization reference information. Therefore, the provisioner needs to transmit the identification information of the BLE Mesh device to the IoT cloud platform, such that the IoT cloud platform can know the random value generated by the BLE Mesh device.

At Step 434, the IoT cloud platform calculates the second provisioning authorization value based on the authorization reference information.

The IoT cloud platform can calculate the second provisioning authorization value based on the authorization reference information including the identification information of the BLE Mesh device. Correspondingly, the basis used by the BLE Mesh device for calculating the first provisioning authorization value may include a setup code. In order to ensure that the first provisioning authorization value and the second provisioning authorization value are consistent, In at least one embodiment, the above Step 434 may include: obtaining the setup code, and processing the setup code and the authorization reference information using the first encryption algorithm to obtain the second provisioning authorization value. Since the BLE Mesh device and the provisioner can obtain the setup code by means of output security verification or input security verification, the provisioner can transmit the setup code to the IoT cloud platform, such that the IoT cloud platform can know the setup code. After that, the IoT cloud platform may use the same algorithm and parameter as the BLE Mesh device, i.e., the first encryption algorithm and the authorization reference information, to calculate the second provisioning authorization value. In at least one embodiment, the first encryption algorithm may be the SHA256 algorithm, and when the identification information of the BLE Mesh device includes the provisioning random value generated by the BLE Mesh device and the device identifier of the BLE Mesh device, and the authorization reference information further includes the security credential of the BLE Mesh device, the second provisioning authorization value can be calculated as follows:

$$AuthValue=SHA256(Did,Random,Secret,SetupCode).$$

It should be noted that the device identifier of the BLE Mesh device and the security credential of the BLE Mesh device can be preconfigured in the IoT cloud platform, such that the IoT cloud platform can calculate the second provisioning authorization value based on the device identifier and the security credential of the BLE Mesh device stored therein. It should also be noted that in the embodiment of the present disclosure, the BLE Mesh device and the IoT cloud platform can use other encryption algorithms or add/delete other parameters to calculate the provisioning authorization value, as long as they use the same encryption algorithm and parameter for calculation. For example, the BLE Mesh device and the IoT cloud platform can calculate the provisioning authorization value based on the identification information of the BLE Mesh device and the security credential of the BLE Mesh device, without the setup code of the BLE Mesh device, such that in the case of the SHA256 algorithm, the first provisioning authorization value (AuthValue1) and the second provisioning authorization value (AuthValue2) can be calculated as follows:

$$AuthValue1=SHA256(Did,Random,Secret); \text{ and}$$

$$AuthValue2=SHA256(Did,Random,Secret).$$

At Step 436, the IoT cloud platform transmits the second provisioning authorization value to the provisioner.

After calculating the second provisioning authorization value, the IoT cloud platform transmits the second provisioning authorization value to the provisioner, such that the provisioner can then perform security verification with the BLE Mesh device using the second provisioning authorization value.

To summarize, with the technical solutions according to the embodiments of the present disclosure, the same encryption algorithm is used by the BLE Mesh device and the IoT cloud platform to process the same parameter to obtain the provisioning authorization values. Then the IoT cloud platform transmits the calculated provisioning authorization value to the provisioner, such that the provisioner can then perform security verification with the BLE Mesh device based on the provisioning authorization value. In the technical solutions according to the embodiments of the present disclosure, the encryption algorithms and parameters used by the BLE Mesh device and the IoT cloud platform are the same, thus ensuring that the provisioning authorization values calculated by the BLE Mesh device and the IoT cloud platform are consistent, thereby avoiding security verification failure due to inconsistent provisioning authorization values, and improving the success rate of BLE Mesh device provisioning.

In the following, the scheme in which the second provisioning authorization value is calculated by the IoT cloud platform and the provisioner will be described.

Figure 6:
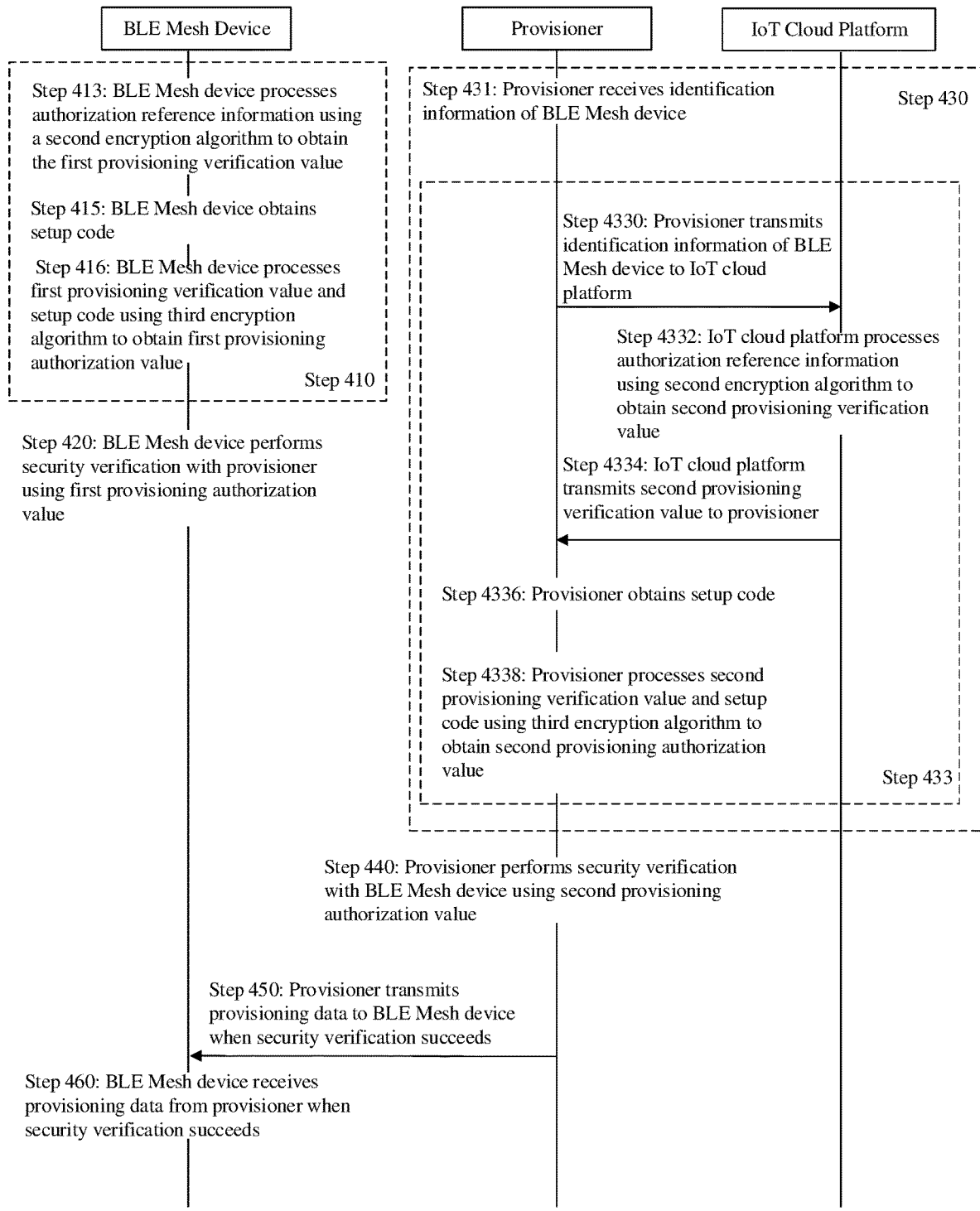
FIG. 6 is a flowchart of calculating a provisioning authorization value according to another embodiment of the present disclosure.

In an example, as shown in FIG. 6, the above Step 410 includes:

At Step 413, the BLE Mesh device processes the authorization reference information using a second encryption algorithm to obtain the first provisioning verification value.

The BLE Mesh device may use the second encryption algorithm to process the authorization reference information including the identification information of the BLE Mesh device to obtain the first provisioning verification value (VerifiValue). The embodiment of the present disclosure is not limited to any specific second encryption algorithm used by the BLE Mesh device. In at least one embodiment, the second encryption algorithm may be the SHA256 algorithm. When the identification information of the BLE Mesh device includes the provisioning random value generated by the BLE Mesh device and the device identifier of the BLE Mesh device, and the authorization reference information further includes the security credential of the BLE Mesh device, the first provisioning authorization value can be calculated as follows:

VerifiValue=SHA256(Did,Random,Secret).

At Step 415, the BLE Mesh device obtains a setup code.

For the process of the BLE Mesh device obtaining the setup code, reference can be made to the above embodiment, and details thereof will be omitted here.

At Step 416, the BLE Mesh device processes the first provisioning verification value and the setup code using a third encryption algorithm to obtain the first provisioning authorization value.

The BLE Mesh device can use the third encryption algorithm to process the first provisioning verification value and the setup code to obtain the first provisioning authorization value. The embodiment of the present disclosure is not limited to any specific third encryption algorithm used by the BLE Mesh device. In at least one embodiment, the third encryption algorithm may be the SHA256 algorithm, and the first provisioning authorization value can be calculated as follows:

AuthValue=SHA256(SetupCode,VerifiValue).

In at least one embodiment, the BLE Mesh device can skip the Step 413, and merge the Step 413 into the Step 416. That is, without calculating the first provisioning verification value, the first provisioning authorization value can be calculated directly based on the authorization reference information and the setup code. That is, the BLE Mesh device may use the same method as the above embodiment to calculate the first provisioning authorization value, and the embodiment of the present disclosure is not limited to this.

Corresponding to the above example, as shown in FIG. 6, the above step 430 includes the following steps.

At Step 431, the provisioner receives the identification information of the BLE Mesh device.

For the description of the provisioner receiving the identification information of the BLE Mesh device, reference can be made to the above embodiment, and details thereof will be omitted here.

At Step 433, the provisioner calculates the second provisioning authorization value based on the authorization reference information.

The provisioner may calculate the second provisioning authorization value based on the authorization reference information including the identification information of the BLE Mesh device. In at least one embodiment, as shown in FIG. 6, the above step 433 may include the following steps.

At Step 4330, the provisioner transmits the identification information of the BLE Mesh device to the IoT cloud platform.

For the description of the provisioner transmitting the identification information of the BLE Mesh device to the IoT cloud platform, reference can be made to the above embodiment, and details thereof will be omitted here.

At Step 4332, the IoT cloud platform processes the authorization reference information using the second encryption algorithm to obtain the second provisioning verification value.

The IoT cloud platform can use the second encryption algorithm to process the authorization reference information including the identification information of the BLE Mesh device to obtain the second provisioning verification value. The embodiment of the present disclosure is not limited to any specific second encryption algorithm used by the IoT cloud platform. In at least one embodiment, the second encryption algorithm may be the SHA256 algorithm. When the identification information of the BLE Mesh device includes the provisioning random value generated by the BLE Mesh device and the device identifier of the BLE Mesh device, and the authorization reference information further includes the security credential of the BLE Mesh device, the second provisioning verification value can be calculated as follows:

VerifiValue=SHA256(Did,Random,Secret).

At Step 4334, the IoT cloud platform transmits the second provisioning verification value to the provisioner.

After calculating the second provisioning verification value, the IoT cloud platform can transmit the second provisioning verification value to the provisioner, such that the provisioner can further calculate the second provisioning authorization value based on the second provisioning authorization value.

At Step 4336, the provisioner obtains a setup code.

This embodiment of the present disclosure is not limited to any specific scheme in which the provisioner obtains the setup code. In at least one embodiment, when a verification type of the security verification is input security verification, the setup code may be directly generated by the provisioner; or when the verification type is output security verification and the setup code is a sound, the BLE Mesh device can produce the sound, and then the provisioner can receive it to obtain the setup code. For the description of the setup code and the verification type of the security verification, reference can be made to the following embodiments, and details thereof will be omitted here.

At Step 4338, the provisioner processes the second provisioning verification value and the setup code using the third encryption algorithm to obtain the second provisioning authorization value.

The provisioner may use the third encryption algorithm to process the second provisioning verification value and the setup code to obtain the second provisioning authorization value. The embodiment of the present disclosure is not limited to any specific third encryption algorithm used by the provisioner. In at least one embodiment, the third encryption algorithm may be the SHA256 algorithm, and the second provisioning authorization value can be calculated as follows:

$$\text{AuthValue}=\text{SHA256}(\text{SetupCode},\text{VerifiValue}).$$

It should be noted that, in the embodiment of the present disclosure, the BLE Mesh device and the provisioner can use other encryption algorithms or add/delete other parameters to calculate the provisioning authorization value, as long as they use the same encryption algorithm and parameter for calculation.

To summarize, in the technical solutions according to the embodiments of the present disclosure, the same encryption algorithm is used by the BLE Mesh device and the provisioner to process the same parameter to obtain the provisioning authorization values. Since the same encryption algorithm and parameter are used, it ensures that the provisioning authorization values calculated by the BLE Mesh device and the provisioner are consistent, thereby avoiding security verification failure due to inconsistent provisioning authorization values, and improving the success rate of BLE Mesh device provisioning.

It should be noted that, in the embodiments of the present disclosure, the "first provisioning authorization value" is only used to represent the provisioning authorization value at the BLE Mesh device, and the "second provisioning authorization value" is only used to represent the provisioning authorization value at the provisioner. It can be appreciated that when different encryption algorithms are used to process the authorization reference information, the obtained "first provisioning authorization value" or "second provisioning authorization value" may be the same or different. The embodiment of the present disclosure is not limited to this. For example, the first provisioning authorization value calculated by using the above first encryption algorithm may be different from the first provisioning authorization value obtained by using the above second encryption algorithm and the above third encryption algorithm. That is, the first provisioning authorization values calculated in the Step 414 in the above embodiment of FIG. 5 and the Step 416 in the above embodiment of FIG. 6 may be the same or different.

In the following, the process of security verification between the BLE Mesh device and the provisioner will be described.

Figure 7:
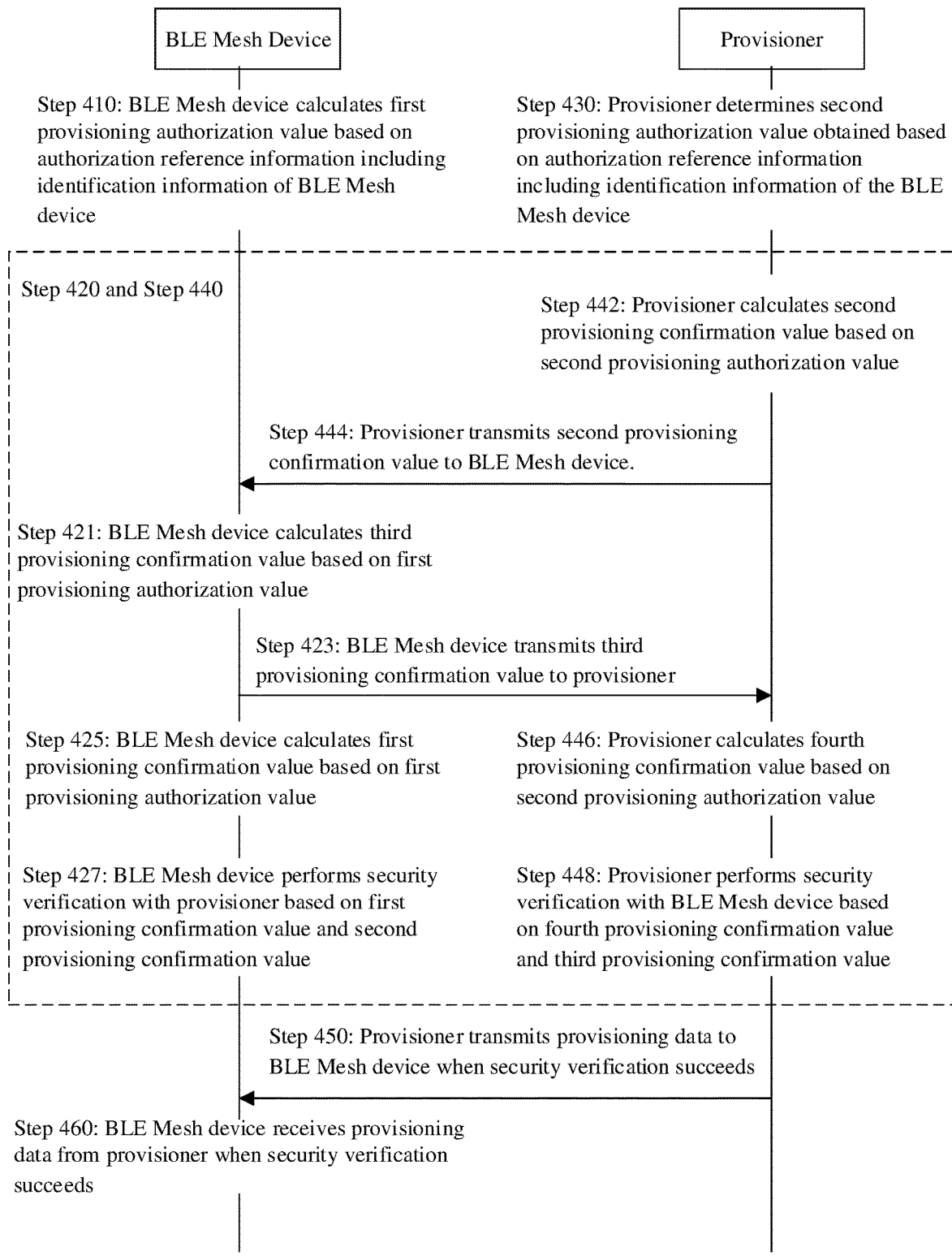
FIG. 7 is a flowchart of security verification according to another embodiment of the present disclosure.

In an example, as shown in FIG. 7, the above steps 420 and 440 may include the following steps.

At Step 442, the provisioner calculates the second provisioning confirmation value based on the second provisioning authorization value.

The provisioner may calculate the second provisioning confirmation value (Confirmation2) based on the second provisioning authorization value, so as to use the second provisioning confirmation value to perform security verification with the BLE Mesh device. In at least one embodiment, the above Step 442 may include: the provisioner processing the second provisioning authorization value and a provisioning random value generated by the provisioner using a fourth encryption algorithm to obtain the second provisioning confirmation value. The provisioner may use the fourth encryption algorithm to process the second provisioning authorization value and the random value generated by the provisioner to obtain the second provisioning confirmation value. The embodiment of the present disclosure is not limited to any specific fourth encryption algorithm used by the provisioner. In at least one embodiment, the fourth encryption algorithm may be the AES-CMAC algorithm, and the second provisioning authorization value can be calculated as follows:

$$\text{Confirmation2}=\text{AES-CMAC}_{ConfirmationKey}(\text{Random-Provisioner}\|\text{AuthValue2}),$$

where ConfirmationKey refers to a shared key calculated by the BLE Mesh device and the provisioner. They can exchange their respective public keys, and then each can use its own key and the public key obtained by exchange to calculate the shared key. For the calculation process, reference can be made to the above embodiment, and details thereof will be omitted here.

At Step 444, the provisioner transmits the second provisioning confirmation value to the BLE Mesh device.

After calculating the second provisioning confirmation value, the provisioner transmits the second provisioning confirmation value to the BLE Mesh device, such that the BLE Mesh device can verify the identity of the provisioner.

At Step 421, the BLE Mesh device calculates a third provisioning confirmation value based on the first provisioning authorization value.

The BLE Mesh device can calculate the third provisioning confirmation value (Confirmation3) based on the first provisioning authorization value, so as to use the third provisioning confirmation value to perform security verification with the provisioner. In at least one embodiment, the above Step 421 may include: the BLE Mesh device processing the first provisioning authorization value and a provisioning random value generated by the BLE Mesh device using a fourth encryption algorithm to obtain the third provisioning confirmation value. The BLE Mesh device can use the fourth encryption algorithm to process the first provisioning authorization value and the provisioning random value generated by the BLE Mesh device to obtain the third provisioning confirmation value. The embodiment of the present disclosure is not limited to any specific fourth encryption algorithm used by the BLE Mesh device. In at least one embodiment, the fourth encryption algorithm may be the AES-CMAC algorithm, and the third provisioning confirmation value can be calculated as follows:

$$\text{Confirmation3}=\text{AES-CMAC}_{ConfirmationKey}(\text{RandomDevice}\|\text{AuthValue1}).$$

For the description of ConfirmationKey, reference can be made to the above embodiment, and details thereof will be omitted here.

At Step 423, the BLE Mesh device transmits the third provisioning confirmation value to the provisioner.

After calculating the third provisioning confirmation value, the BLE Mesh device transmits the third provisioning confirmation value to the provisioner, such that the provisioner can verify the identity of the BLE Mesh device.

At Step 446, the provisioner calculates a fourth provisioning confirmation value based on the second provisioning authorization value.

The provisioner may calculate the fourth provisioning confirmation value (Confirmation4) based on the second provisioning authorization value, so as to perform security verification with the BLE Mesh device based on the fourth provisioning confirmation value and the third provisioning confirmation value. In at least one embodiment, the above identification information of the BLE Mesh device may include a provisioning random value generated by the BLE Mesh device. The above step 446 includes: the provisioner processing the second provisioning authorization value and the random value generated by the BLE Mesh device using a fourth encryption algorithm to obtain the fourth provisioning confirmation value. The provisioner may use the fourth encryption algorithm to process the second provisioning authorization value and the random value generated by the BLE Mesh device to obtain the fourth provisioning confirmation value. The embodiment of the present disclosure is not limited to any specific fourth encryption algorithm used by the provisioner. In at least one embodiment, the fourth encryption algorithm may be the AES-CMAC algorithm, and the fourth provisioning confirmation value can be calculated as follows:

$$\text{Confirmation4} = \text{AES-CMAC}_{ConfirmationKey}(\text{RandomDevice}\|\text{AuthValue2}).$$

At Step 448, the provisioner performs security verification with the BLE Mesh device based on the fourth provisioning confirmation value and the third provisioning confirmation value.

The provisioner verifies the identity of the BLE Mesh device based on the fourth provisioning confirmation value and the third provisioning confirmation value, that is, performs security verification with the BLE Mesh device. In at least one embodiment, the provisioner compares the fourth provisioning confirmation value with the third provisioning confirmation value, and when the fourth provisioning confirmation value and the third provisioning confirmation value are the same, confirms the identity of the BLE Mesh device, that is, the security verification succeeds.

At Step 425, the BLE Mesh device calculates the first provisioning confirmation value based on the first provisioning authorization value.

The BLE Mesh device may calculate the first provisioning confirmation value (Confirmation1) based on the first provisioning authorization value, so as to perform security verification with the provisioner based on the first provisioning confirmation value and the second provisioning confirmation value. In at least one embodiment, the above step 425 may include: the BLE Mesh device receiving the provisioning random value generated by the provisioner; and processing the first provisioning authorization value and the provisioning random value generated by the provisioner using a fourth encryption algorithm to obtain the first provisioning confirmation value. The BLE Mesh device can use the fourth encryption algorithm to process the first provisioning authorization value and the random value generated by the provisioner to obtain the first provisioning confirmation value. The embodiment of the present disclosure is not limited to any specific fourth encryption algorithm used by the BLE Mesh device. In at least one embodiment, the fourth encryption algorithm may be the AES-CMAC algorithm, and the first provisioning confirmation value can be calculated as follows:

$$\text{Confirmation1} = \text{AES-CMAC}_{ConfirmationKey}(\text{RandomProvisioner}\|\text{AuthValue1}).$$

At Step 427, the BLE Mesh device performs security verification with the provisioner based on the first provisioning confirmation value and the second provisioning confirmation value.

The BLE Mesh device verifies the identity of the provisioner based on the first provisioning confirmation value and the second provisioning confirmation value, that is, performs security verification with the provisioner. In at least one embodiment, the BLE Mesh device compares the first provisioning confirmation value with the second provisioning confirmation value, and when the first provisioning confirmation value and the second provisioning confirmation value are the same, confirms the identity of the provisioner, that is, the security verification succeeds.

It should be noted that, in the embodiment of the present disclosure, the BLE Mesh device and the provisioner can use other encryption algorithms or add/delete other parameters to calculate the provisioning confirmation value, as long as they use the same encryption algorithm and parameter for calculation.

It should also be noted that, corresponding to the above embodiment where the BLE Mesh device and the provisioner calculate the provisioning authorization values based on the provisioning verification values, the BLE Mesh device and the provisioner may not calculate the provisioning authorization values, and may calculate the provisioning confirmation values directly based on the provisioning verification values, the setup code and the provisioning random values. For example, the first provisioning confirmation value can be calculated based on the provisioning random value generated by the provisioner, the setup code and the first provisioning verification value (VerifiValue1). The second provisioning confirmation value can be calculated based on the provisioning random value generated by the provisioner, the setup code and the second provisioning verification value (VerifiValue2). The third provisioning confirmation value can be calculated based on the provisioning random value generated by the BLE Mesh device, the setup code and the first provisioning verification value. The fourth provisioning confirmation value can be calculated based on the provisioning random value generated by the BLE Mesh device, the setup code and the second provisioning verification value, as follows:

$$\text{Confirmation1} = \text{AES-CMAC}_{ConfirmationKey}(\text{RandomProvisioner}\|\text{SetupCode}\|\text{VerifiValue1});$$

$$\text{Confirmation2} = \text{AES-CMAC}_{ConfirmationKey}(\text{RandomProvisioner}\|\text{SetupCode}\|\text{VerifiValue2});$$

$$\text{Confirmation3} = \text{AES-CMAC}_{ConfirmationKey}(\text{RandomDevice}\|\text{SetupCode}\|\text{VerifiValue1});$$

and $$\text{Confirmation4} = \text{AES-CMAC}_{ConfirmationKey}(\text{RandomDevice}\|\text{SetupCode}\|\text{VerifiValue2}).$$

It should also be noted that, corresponding to the above embodiment where the BLE Mesh device and the provisioner calculate the provisioning authorization values based on the identification information of the BLE Mesh device but not based on the setup code, the BLE Mesh device and the provisioner can calculate the provisioning confirmation values based further on the parameter of the setup code. For example, the provisioning confirmation values can be calculated by the BLE Mesh device and the provisioner respectively as follows:

Confirmation1=AES-CMAC$_{ConfirmationKey}$(Random-Provisioner||SetupCode||AuthValue 1);

Confirmation2=AES-CMAC$_{ConfirmationKey}$(Random-Provisioner||SetupCode||AuthValue 2);

Confirmation3=AES-CMAC$_{ConfirmationKey}$(RandomDevice||SetupCode||AuthValue 1);

and

Confirmation4=AES-CMAC$_{ConfirmationKey}$(RandomDevice||SetupCode||AuthValue 2).

It should also be noted that the embodiment of the present disclosure is not limited to any specific types of the first encryption algorithm, the second encryption algorithm, the third encryption algorithm, and the fourth encryption algorithm, and is not limited to any specific relationship between them. In at least one embodiment, the first encryption algorithm, the second encryption algorithm, the third encryption algorithm and the fourth encryption algorithm may all be the same encryption algorithm. Alternatively, any two of the first encryption algorithm, the second encryption algorithm, the third encryption algorithm and the fourth encryption algorithm may be the same encryption algorithm. Alternatively, the first encryption algorithm, the second encryption algorithm, the third encryption algorithm and the fourth encryption algorithm may be all different encryption algorithms.

To summarize, in the technical solutions according to the embodiments of the present disclosure, on one hand, the BLE Mesh device and the provisioner calculate the provisioning confirmation values based on their respective calculated provisioning authorization values and generated random values. On the other hand, the BLE Mesh device and the provisioner calculate the provisioning confirmation values based on their respective calculated provisioning authorization values and the provisioning random values generated by each other as obtained by exchange. Then each compares the calculated provisioning confirmation value with the provisioning confirmation value calculated by each other as obtained by exchange, and when the two confirmation values are the same, the identity of each other is confirmed, that is, the security verification succeeds, thereby providing a security verification scheme to ensure the proper security verification.

In the following, the process of determining the verification type of the security verification will be described.

In an example, the above method may further include: determining a verification type of the security verification. The verification type of the security verification includes input security verification or output security verification.

Compared with static security verification and no security verification, the verification schemes of output security verification and input security verification need to generate a setup code, and perform a part of the steps in the security verification process based on the setup code, thus the input security verification and output security verification has better performance. In order to ensure the security of the BLE Mesh device and the provisioner, In at least one embodiment, in an embodiment of the present disclosure, when the BLE Mesh device and the provisioner support output security verification, the verification type of the security verification can be output security verification, and the verification scheme of output security verification is prioritized. When the BLE Mesh device and the provisioner support input security verification, the verification type of the security verification can be input security verification, and the verification scheme of input security verification is prioritized. In at least one embodiment, when the BLE Mesh device and the provisioner support neither of output security verification and input security verification, the verification scheme of static security verification or no security verification can be used. In practice, which verification scheme is to be used can depend on the functional implementation of the BLE Mesh device and the provisioner.

It can be seen from the above embodiment that a setup code will be generated regardless of whether the input security verification or the output security verification is used, but the entity generating the setup code is different. Exemplarily, when the verification type of the security verification includes input security verification, the setup code is generated by the provisioner, and then the setup code is outputted. After knowing the setup code, the user can input the setup code to the BLE Mesh device. When the verification type of the security verification includes output security verification, the setup code is generated by the BLE Mesh device, and then the setup code is outputted. After knowing the setup code, the user can input the setup code to the provisioner. The embodiment of the present disclosure is not limited to the content of the setup code. In at least one embodiment, the setup code may be a dynamic random value or the setup code may be a static random value. The embodiment of the present disclosure is not limited to any specific output scheme of the setup code. In at least one embodiment, the setup code may be outputted by screen display, sound, flashing, vibration, QR code, or record in manual (for example, the setup code may be pre-recorded in the manual of the BLE Mesh device). In practice, the specific output scheme of the setup code depends on the implementation of the BLE Mesh device or the provisioner. For example, when the BLE Mesh device is to output the setup code, if the BLE Mesh device has no screen and cannot produce sound (such as a smart light), it can output the setup code by flashing, or output the setup code as recorded in the manual. Correspondingly, the embodiment of the present disclosure is not limited to the input scheme of the setup code. In practice, the specific input method may depend on the output scheme of the setup code and the function implementation of the BLE Mesh device or the provisioner. For example, if the BLE Mesh device records a setup code in the form of a QR code recorded in the manual, the provisioner can scan the QR code recorded in the manual to input the setup code.

The verification type of the security verification can be output security verification or input security verification, but the specific verification type needs to be further determined by the BLE Mesh device and the provisioner. For example, the BLE Mesh device supports the output security verification and the input security verification, but the provisioner only supports the output security verification (it should be noted that the output security verification here still means that the setup code is outputted by the BLE Mesh device), then the verification type of the security verification needs to be determined as the output security verification to ensure proper security verification. Therefore, in an embodiment of the present disclosure, before the BLE Mesh device and the provisioner perform the security verification, the verification type of the security verification needs to be determined first. The embodiment of the present disclosure is not limited to any scheme in which the BLE Mesh device and the provisioner determine the verification type of the security verification. In at least one embodiment, the verification type of the security verification may be determined by negotiation between the BLE Mesh device and the provisioner, or determined by the IoT platform. For the scheme of determining the verification type of the security verification, reference can be made to the following embodiments, and details thereof will be omitted here.

Corresponding to the above example, the above step 420 may include: the BLE Mesh device performing security verification with the provisioner according to the verification type.

After the BLE Mesh device knows the verification type of the security verification, it performs security verification with the provisioner according to the verification type. For example, if the verification type of the security verification is output security verification, the BLE Mesh device outputs the setup code first, so as to facilitate subsequent execution of the security verification process.

Corresponding to the above example, the above step 440 may include: the provisioner performing security verification with the BLE Mesh device according to the verification type.

After the provisioner knows the verification type of the security verification, it performs security verification with the BLE Mesh device according to the verification type. For example, if the verification type of the security verification is input security verification, the provisioner outputs the setup code first, to facilitate subsequent execution of the security verification process.

In at least one embodiment, the above operation of determining the verification type of the security verification may include: the provisioner transmitting type confirmation information to the BLE Mesh device. The type confirmation information indicates the verification type of the security verification.

The provisioner can independently determine the verification type of the security verification. In at least one embodiment, the provisioner can determine the verification type of the security verification based on its own functions. For example, when the provisioner only supports output security verification (a QR code is generated by the BLE Mesh device in this case), the provisioner can directly determine that the verification type of the security verification is output security verification, and notify the BLE Mesh device to use output security verification. In another example, when the provisioner supports output security verification and input security verification, it can determine to prioritize output security verification, and to use input security verification when the BLE Mesh device does not support output security verification, or determine to prioritize input security verification, and to use output security verification when the BLE Mesh device does not support output security verification. In at least one embodiment, the provisioner can notify the BLE Mesh device of the verification type of the security verification by transmitting the type confirmation information to the BLE Mesh device, the type confirmation information indicating the verification type of the security verification.

In at least one embodiment, the above operation of determining the verification type of the security verification may include: the IoT cloud platform determining the verification type of the security verification based on the identification information of the BLE Mesh device; and transmitting type confirmation information to the provisioner, the type confirmation information indicating the verification type of the security verification.

The IoT cloud platform can independently determine the verification type of the BLE Mesh device. In at least one embodiment, the IoT cloud platform can determine the verification type of the security verification based on the identification information of the BLE Mesh device. For example, the IoT cloud platform can obtain a device type of the BLE Mesh device from the identification information of the BLE Mesh device, so as to determine the verification type of the security verification based on the device type. For example, when the device type of the BLE Mesh device is smart light, the IoT The cloud platform may determine the verification type of the security verification as output security verification. After the IoT cloud platform determines the verification type of the security verification, it can further transmit the verification type to the provisioner, and then the provisioner can notify the BLE Mesh device accordingly. In an embodiment of the present disclosure, the IoT cloud platform may also determine to prioritize a certain security verification scheme, and when the provisioner or BLE Mesh device does not support the security verification scheme, the other security verification scheme can be used.

Figure 8:
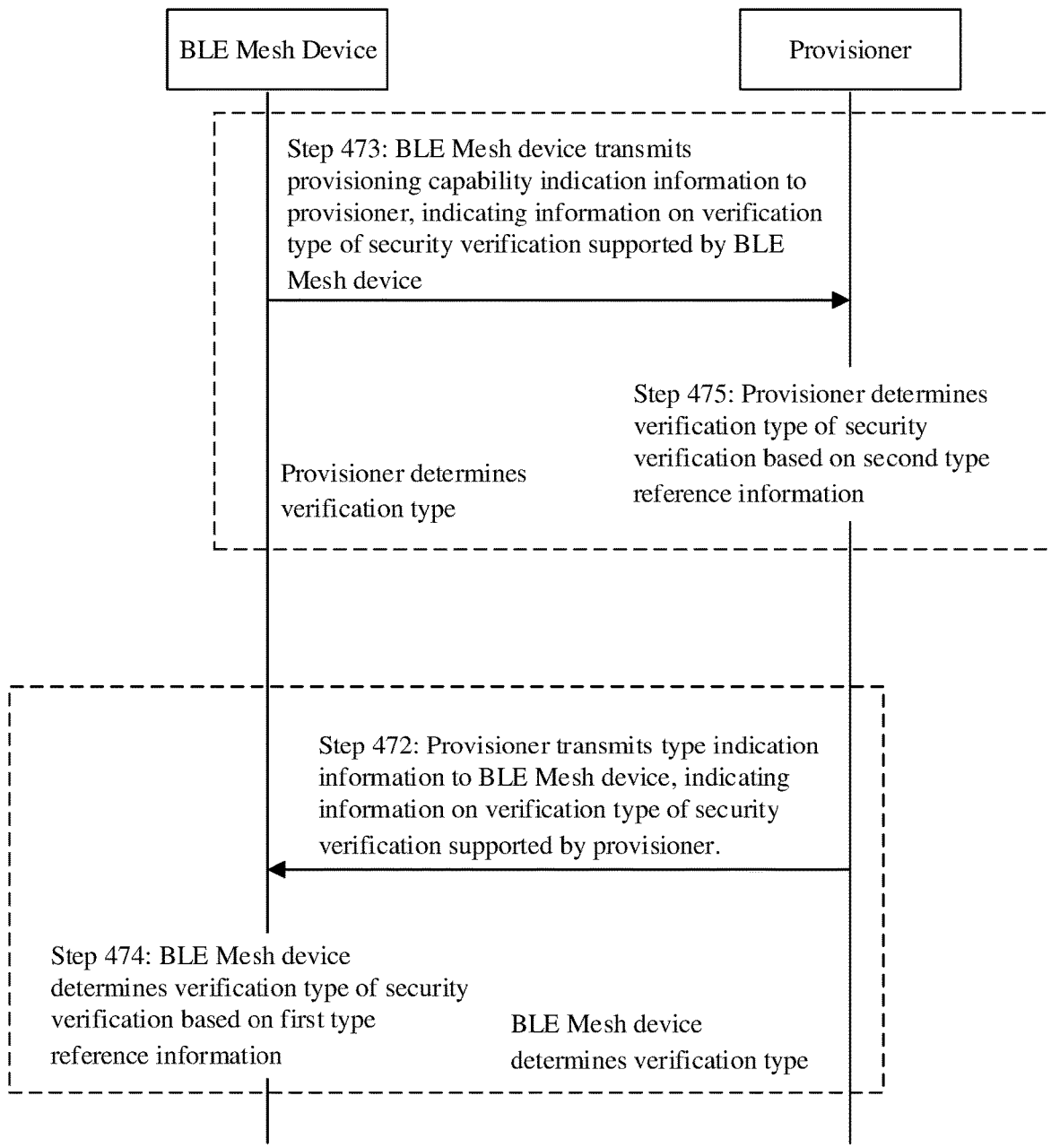
FIG. 8 is a flowchart of determining a verification type according to an embodiment of the present disclosure.

In at least one embodiment, as shown in FIG. 8, the above process of determining the verification type of the security verification may include the following steps.

At Step 473, the BLE Mesh device transmits provisioning capability indication information to the provisioner. The provisioning capability indication information indicates information on the verification type of the security verification supported by the BLE Mesh device.

The BLE Mesh device and the provisioner can negotiate the verification type of the security verification with each other, thereby ensuring that both can use the determined verification type of the security verification to perform security verification. In order to achieve the purpose of negotiation, the BLE Mesh device can transmit the provisioning capability indication information to the provisioner, and the provisioning capability indication information indicates information on the verification type of the security verification supported by the BLE Mesh device. For example, the provisioning capability indication information may indicate that the BLE Mesh device support input security verification and output security verification, and the scheme of output security verification is prioritized.

The embodiment of the present disclosure is not limited to any specific timing at which the BLE Mesh device transmits the provisioning capability indication information to the provisioner. In at least one embodiment, when the provisioner transmits a Provisioning Invite message to the BLE Mesh device, the BLE Mesh device may transmit the provisioning capability indication information to the provisioner after receiving the Provisioning Invite message. Alternatively, the BLE Mesh device may transmit the provisioning capability indication information to the provisioner after establishing a link with the provisioner.

At Step 475, the provisioner determines the verification type of the security verification based on second type reference information.

After receiving the provisioning capability indication information from the BLE Mesh device, the provisioner can determine the verification type of the security verification based on the second type reference information. The embodiment of the present disclosure is not limited to any specific content of the second type reference information used by the provisioner. In at least one embodiment, the second type reference information may include at least one of: the provisioning capability indication information, or information on the verification type of the security verification supported by the provisioner. In at least one embodiment, when the IoT cloud platform transmits type confirmation information to the provisioner, the second type reference information may further include the type confirmation message. In at least one embodiment, after determining the verification type of the security verification, the provisioner may transmit the type confirmation information to the BLE Mesh device to notify the BLE Mesh device of the verification type of the security verification to be used. In at least one embodiment, the type confirmation information may be carried in a Provisioning Start message.

In at least one embodiment, as shown in FIG. 8, the above process of determining the verification type of the security verification may include the following steps.

At Step 472, the provisioner transmits type indication information to the BLE Mesh device. The type indication information indicates information on the verification type of the security verification supported by the provisioner.

It can be seen from the above description that the verification type of the security verification can be negotiated between the BLE Mesh device and the provisioner. For the purpose of negotiation, the provisioner can transmit the type indication information to the BLE Mesh device to indicate the information on the verification type of the security verification supported by the provisioner. For example, the type indication information may indicate that the provisioner supports input security verification and output security verification, and the scheme of output security verification is prioritized. In at least one embodiment, the type indication information transmitted by the provisioner to the BLE Mesh device may be carried in a Provisioning Invite message.

At Step 474, the BLE Mesh device determines the verification type of the security verification based on first type reference information.

After receiving the type indication information from the provisioner, the BLE Mesh device can determine the verification type of the security verification based on the first type reference information. The embodiment of the present disclosure is not limited to any specific content of the first type reference information used by the BLE Mesh device. In at least one embodiment, the first type reference information may include at least one of: the type indication information or information on the verification type of the security verification supported by the BLE Mesh device. In at least one embodiment, when the Provisioning Invite message transmitted by the provisioner to the BLE Mesh device includes the type confirmation information transmitted by the IoT cloud platform to the provisioner, the first type reference information may further include the type confirmation information transmitted by the IoT cloud platform to the provisioner.

To summarize, in the technical solutions according to the embodiments of the present disclosure, the verification type of the security verification to be used is determined before the BLE Mesh device and the provisioner perform the security verification, so as to ensure that the BLE Mesh device and the provisioner can perform the security verification properly according to the verification type, thereby avoiding security verification failure due to use of the verification type that is not supported by each other, and improving the performance of the BLE Mesh device and the provisioner. In addition, in the technical solutions according to the embodiments of the present disclosure, a number of schemes for determining the verification type of the security verification are provided, from which the BLE Mesh device and the provisioner can flexibly select to determine the verification type of the security verification. In addition, the BLE Mesh device and the provisioner can determine the verification type of the security verification by negotiation. During the negotiation process, both parties can fully consider the verification type of security verification supported by each other, thus effectively avoiding security verification failure due to the determined security verification not being supported by each other, which further improves the performance of the BLE Mesh device and the provisioner, and improves the success rate of provisioning of the BLE Mesh device.

In the following, the process of the IoT cloud platform verifying the validity of the BLE Mesh device will be described.

In an example, the above method may further include: the IoT cloud platform receiving the identification information of the BLE Mesh device; performing validity verification on the BLE Mesh device based on the identification information of the BLE Mesh device; and transmitting a validity confirmation message to the provisioner when the BLE Mesh device passes the validity verification.

In order to fully verify the validity of the BLE Mesh device, in an embodiment of the present disclosure, after receiving the identification information of the BLE Mesh device, the IoT cloud platform can verify the identity of the BLE Mesh device based on the identification information of the BLE Mesh device, that is, perform validity verification on the BLE Mesh device. When the validity verification succeeds, a validity confirmation message is transmitted to the provisioner to indicate the provisioner that the identity of the BLE Mesh device is valid, and to allow a link to be established between the provisioner and the BLE Mesh device. In at least one embodiment, after receiving the validity confirmation message, the provisioner can transmit a Link Open message to the BLE Mesh device. After the BLE Mesh device receives the Link Open message, it may reply to the provisioner with a Link Acknowledgement message to complete the link establishment between the provisioner and the BLE Mesh device. In at least one embodiment, if the validity verification fails, the IoT cloud platform can terminate the process of the provisioner provisioning the BLE Mesh device.

The embodiment of the present disclosure is not limited to any specific scheme in which the IoT cloud platform performs the validity verification on the BLE Mesh device. In at least one embodiment, the IoT cloud platform may perform the validity verification based on a format of the identification information of the BLE Mesh device. Exemplarily, the IoT device may detect whether the format of the identification information of the BLE Mesh device meets a target format requirement, and when the format of the identification information of the BLE Mesh device meets the target format requirement, determine that the BEL Mesh device passes the validity verification. Here, the target format requirement may be a specification set by the IoT cloud platform for the format of the identification information of the BLE Mesh device, which may be pre-stored in the IoT cloud platform. In at least one embodiment, the identification information of the BLE Mesh device may include a provisioning random value generated by the BLE Mesh device. The above operation of performing the validity verification on the BLE Mesh device based on the identification information of the BLE Mesh device may include: detecting whether the provisioning random value generated by the BLE Mesh device is used for the first time; and determining that the BLE Mesh device passes the validity verification when the provisioning random value generated by the BLE Mesh device is used for the first time. Since the provisioning random value generated by the BLE Mesh device is unique, in order to achieve the purpose of successful provisioning, the provisioning random value of the BLE Mesh device needs to be the provisioning random value used for the first time. If the random value of the BLE Mesh device has been used before, it means that the identity of the BLE Mesh device is invalid, and thus the IoT cloud platform can terminate the process of the provisioner provisioning the BLE Mesh device.

To summarize, in the technical solutions according to the embodiments of the present disclosure, the IoT cloud platform verifies the validity of the BLE Mesh before performing security verification between the provisioner and the BLE Mesh device, so as to fully ensure the security of the identity of the BLE Mesh device. Moreover, in the embodiment of the present disclosure, the IoT cloud platform can perform the validity verification based on the format of the identification information of the BLE Mesh device or the provisioning random value generated by the BLE Mesh device, which improves the flexibility of the validity verification by the IoT cloud platform.

In the following, regarding the scheme for the IoT cloud platform to calculate the provisioning authorization value, the technical solution of the present disclosure will be described with reference to a specific example.

Figure 9:
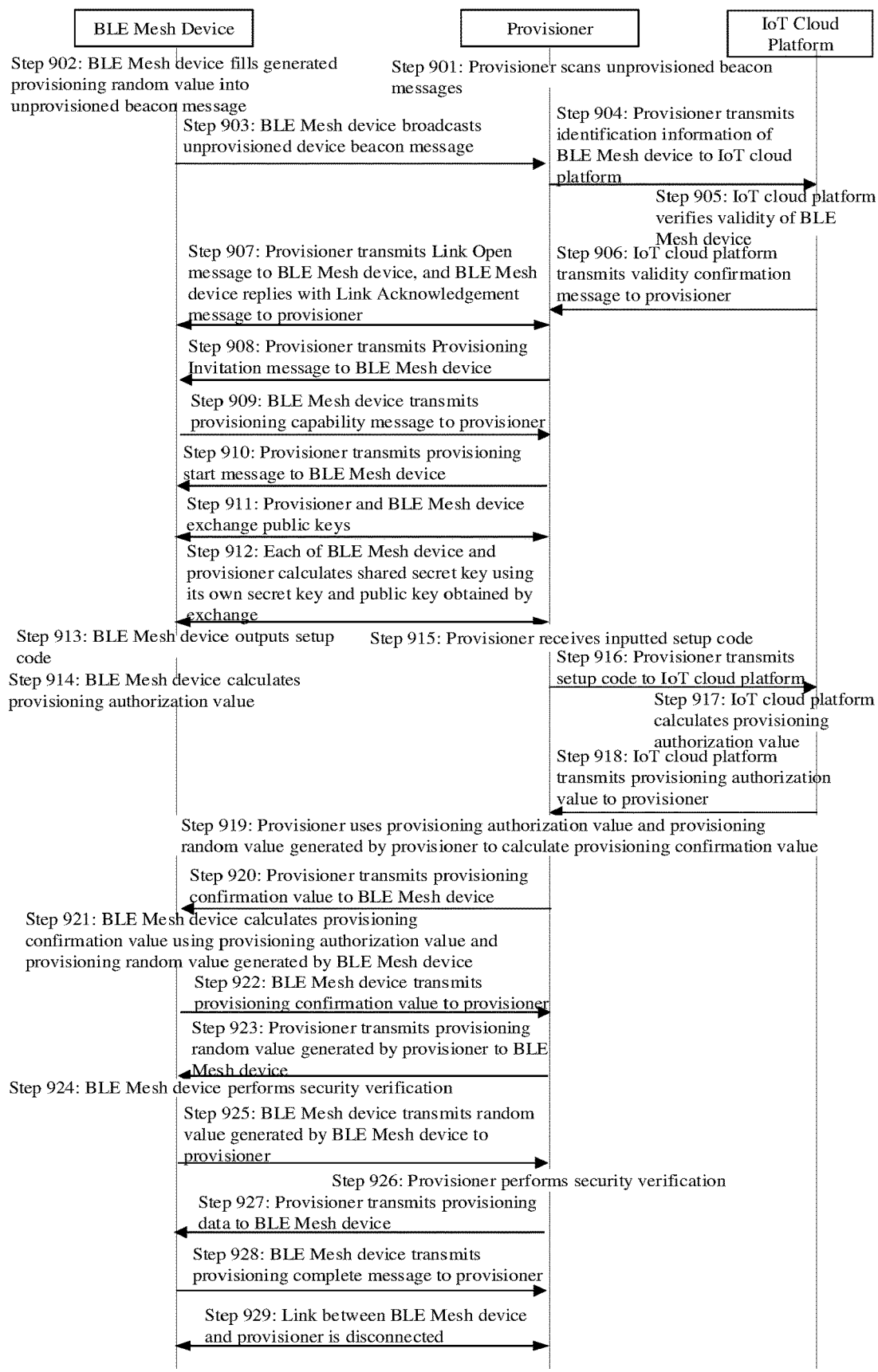
FIG. 9 is a flowchart illustrating a BLE Mesh device provisioning method according to another embodiment of the present disclosure.

Referring to FIG. 9, which is a flowchart illustrating a BLE Mesh device provisioning method according to an embodiment of the present disclosure, the method can be applied in the provisioning system shown in FIG. 1. The method may include the following steps.

At Step 901, a provisioner scans unprovisioned beacon messages. By scanning the unprovisioned device beacon messages of BLE Mesh devices, the provisioner can discover the BLE Mesh devices to be provisioned. In an embodiment of the present disclosure, the unprovisioned beacon message of a BLE Mesh device includes identification information of the BLE Mesh device At Step 902, the BLE Mesh device fills a generated provisioning random value into the unprovisioned beacon message. When the BLE Mesh device enters a provisioning mode, it can generate a provisioning random value and fill it into the unprovisioned device beacon message.

At Step 903, the BLE Mesh device broadcasts the unprovisioned device beacon message. In an embodiment of the present disclosure, the unprovisioned information message of the BLE Mesh device may indicate that the BLE Mesh device is a BLE Mesh device that has not been provisioned.

At Step 904, the provisioner transmits the identification information of the BLE Mesh device to an IoT cloud platform. After the provisioner scans the BLE Mesh device, it transmits the identification information of the BLE Mesh device to the IoT cloud platform.

At Step 905, the IoT cloud platform verifies the validity of the BLE Mesh device. In at least one embodiment, the IoT cloud platform can perform the validity verification by verifying whether a data format of the identification information of the BLE Mesh device conforms to a format of identification information defined by the IoT cloud platform, or by verifying the provisioning random value generated by the BLE Mesh device. If the BLE Mesh device passes the validity verification, the IoT cloud platform continues with the provisioning process, that is, proceeds with Step 916; or otherwise terminates the provisioning process.

At Step 906, the IoT cloud platform transmits a validity confirmation message to the provisioner. The validity confirmation message indicates the validity of the BLE Mesh device and allows establishment of a link between the provisioner and the BLE Mesh device.

At Step 907, the provisioner transmits a Link Open message to the BLE Mesh device, and the BLE Mesh device replies with a Link Acknowledgement message to the provisioner. Thus, a link can be established between the provisioner and the BLE Mesh device.

At Step 908, the provisioner transmits a Provisioning Invitation message to the BLE Mesh device. The Provisioning Invitation message may indicate information on the verification type of the security verification supported by the provisioner.

At Step 909, the BLE Mesh device transmits a provisioning capability message to the provisioner. The provisioning capability message indicates information on the verification type of the security verification supported by the BLE Mesh device. In at least one embodiment, according to one or more of device type information of the BLE Mesh device (from Step 901), the indication from the IoT cloud platform (from Step 906), or the indication from the BLE Mesh device (from Step 909), the provisioner determines whether to use output security validation or input security validation.

At Step 910, the provisioner transmits a provisioning start message to the BLE Mesh device. The provisioning start message indicates whether output security verification or input security verification is to be used. The following steps will be described using the verification scheme of output security verification as an example.

At Step 911, the provisioner and the BLE Mesh device exchange public keys.

At Step 912, each of the BLE Mesh device and the provisioner calculates a shared secret key using its own secret key and the public key obtained by exchange.

At Step 913, the BLE Mesh device outputs a setup code. In at least one embodiment, the setup code is a dynamic or static random value. In at least one embodiment, taking the output security verification as an example, the BLE Mesh device outputs the setup code by means of screen display, sound, flashing, vibration, QR code, record in manual, etc.

At Step 914, the BLE Mesh device calculates a provisioning authorization value. The BLE Mesh device uses the provisioning random value (from Step 902), a device identifier, and a security credential of the BLE Mesh device to calculate the provisioning authorization value.

At Step 915, the provisioner receives an inputted setup code. Usually, provisioner is provided with a user input device such as screen, microphone, and camera. The user can input or confirm the setup code outputted by the BLE Mesh device through the user input device.

At Step 916, the provisioner transmits the setup code to the IoT cloud platform.

At Step 917, the IoT cloud platform calculates a provisioning authorization value. The IoT cloud platform uses the provisioning random value (from Step 904), the device identifier, and the security credential of the BLE Mesh device to calculate the provisioning authorization value.

At Step 918, the IoT cloud platform transmits the provisioning authorization value to the provisioner.

At Step 919, the provisioner uses the provisioning authorization value and the provisioning random value generated by the provisioner to calculate a provisioning confirmation value.

At Step 920, the provisioner transmits the provisioning confirmation value to the BLE Mesh device.

At Step 921, the BLE Mesh device calculates a provisioning confirmation value using the provisioning authorization value and the provisioning random value generated by the BLE Mesh device.

At Step 922, the BLE Mesh device transmits the provisioning confirmation value to the provisioner.

At Step 923, the provisioner transmits the provisioning random value generated by the provisioner to the BLE Mesh device.

At Step 924, the BLE Mesh device performs security verification.

At Step 925, the BLE Mesh device transmits the random value generated by the BLE Mesh device to the provisioner.

At Step 926, the provisioner performs security verification.

At Step 927, the provisioner transmits provisioning data to the BLE Mesh device. When the security verification succeeds, the provisioner transmits the provisioning data to the BLE Mesh device.

At Step 928, the BLE Mesh device transmits a provisioning complete message to the provisioner. The provisioning complete message indicates that the BLE Mesh device joins the BLE Mesh networking.

At Step 929, the link between the BLE Mesh device and the provisioner is disconnected.

In the following, regarding the scheme for the IoT cloud platform and the provisioner to calculate the provisioning authorization value, the technical solution of the present disclosure will be described with reference to a specific example.

Figure 10:
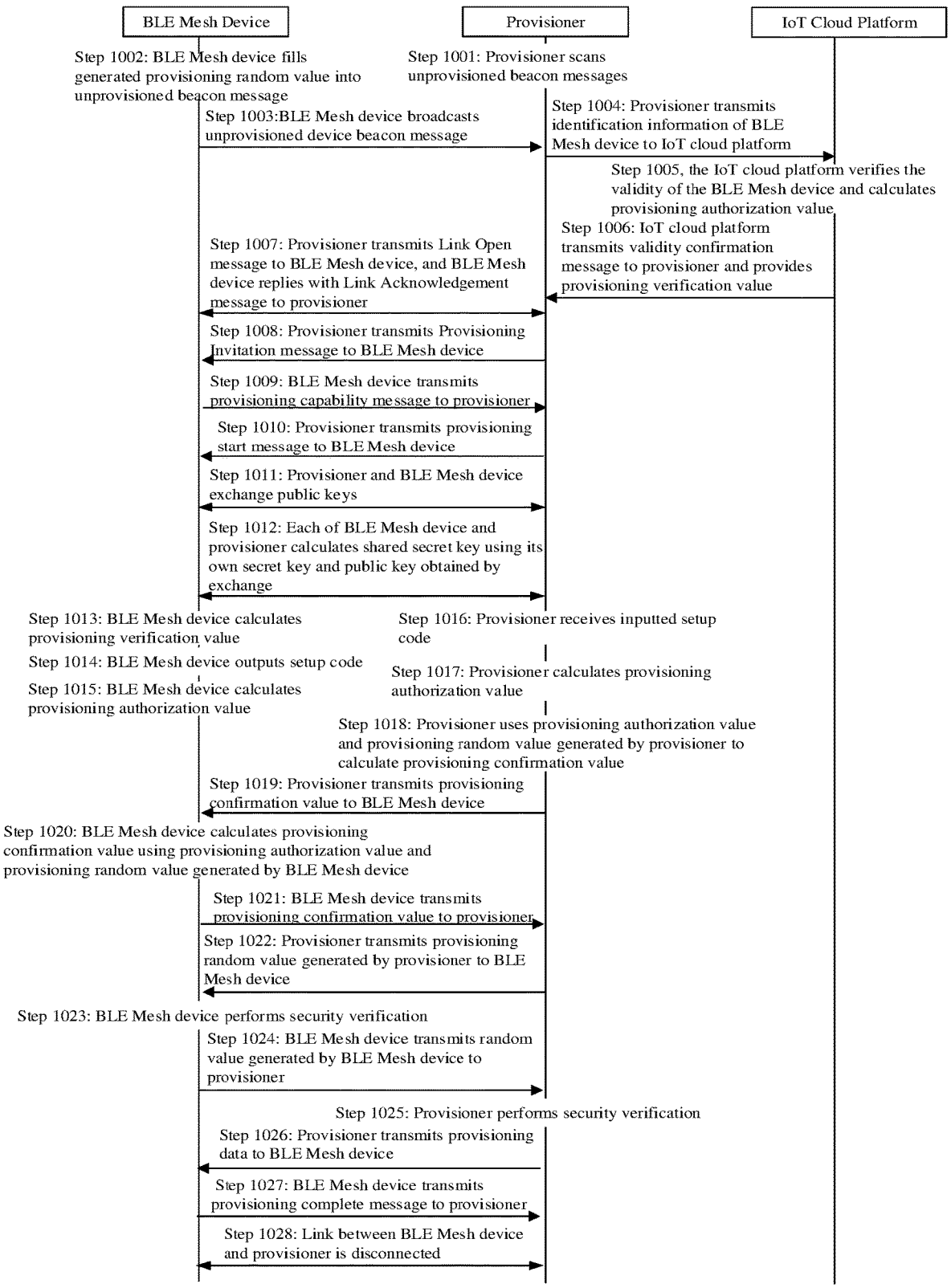
FIG. 10 is a flowchart illustrating a BLE Mesh device provisioning method according to yet another embodiment of the present disclosure.

Referring to FIG. 10, which is a flowchart illustrating a BLE Mesh device provisioning method according to an embodiment of the present disclosure, the method can be applied in the provisioning system shown in FIG. 1. The method may include the following steps.

At Step 1001, a provisioner scans unprovisioned beacon messages. By scanning the unprovisioned device beacon messages of BLE Mesh devices, the provisioner can discover the BLE Mesh devices to be provisioned. In an embodiment of the present disclosure, the unprovisioned beacon message of a BLE Mesh device includes identification information of the BLE Mesh device.

At Step 1002, the BLE Mesh device fills a generated provisioning random value into the unprovisioned beacon message. When the BLE Mesh device enters a provisioning mode, it can generate a provisioning random value and fill it into the unprovisioned device beacon message.

At Step 1003, the BLE Mesh device broadcasts the unprovisioned device beacon message. In an embodiment of the present disclosure, the unprovisioned information message of the BLE Mesh device may indicate that the BLE Mesh device is a BLE Mesh device that has not been provisioned.

At Step 1004, the provisioner transmits the identification information of the BLE Mesh device to an IoT cloud platform. After the provisioner scans the BLE Mesh device, it transmits the identification information of the BLE Mesh device to the IoT cloud platform.

At Step 1005, the IoT cloud platform verifies the validity of the BLE Mesh device, and calculates a provisioning authorization value. In at least one embodiment, the IoT cloud platform can perform the validity verification by verifying whether a data format of the identification information of the BLE Mesh device conforms to a format of identification information defined by the IoT cloud platform, or by verifying the provisioning random value generated by the BLE Mesh device. If the BLE Mesh device passes the validity verification, the IoT cloud platform continues with the provisioning process, that is, proceeds with Step 1006; or otherwise terminates the provisioning process.

At Step 1006, the IoT cloud platform transmits a validity confirmation message to the provisioner, and provides a provisioning verification value. The validity confirmation message indicates the validity of the BLE Mesh device and allows establishment of a link between the provisioner and the BLE Mesh device. In at least one embodiment, the provisioning verification value may be carried in the validity confirmation message.

At Step 1007, the provisioner transmits a Link Open message to the BLE Mesh device, and the BLE Mesh device replies with a Link Acknowledgement message to the provisioner. Thus, a link can be established between the provisioner and the BLE Mesh device.

At Step 1008, the provisioner transmits a Provisioning Invitation message to the BLE Mesh device. The Provisioning Invitation message may indicate information on the verification type of the security verification supported by the provisioner.

At Step 1009, the BLE Mesh device transmits a provisioning capability message to the provisioner. The provisioning capability message indicates information on the verification type of the security verification supported by the BLE Mesh device. In at least one embodiment, according to one or more of device type information of the BLE Mesh device (from Step 901), the indication from the IoT cloud platform (from Step 906), or the indication from the BLE Mesh device (from Step 909), the provisioner determines whether to use output security validation or input security validation.

At Step 1010, the provisioner transmits a provisioning start message to the BLE Mesh device. The provisioning start message indicates whether output security verification or input security verification is to be used. The following steps will be described using the verification scheme of output security verification as an example.

At Step 1011, the provisioner and the BLE Mesh device exchange public keys.

At Step 1012, each of the BLE Mesh device and the provisioner calculates a shared secret key using its own secret key and the public key obtained by exchange.

At Step 1013, the BLE Mesh device calculates a provisioning verification value. The BLE Mesh device uses the identification information of the BEL Mesh device, the provisioning random value generated by the BLE Mesh device, and a security credential of the BLE Mesh device to calculate the provisioning verification value.

At Step 1014, the BLE Mesh device outputs a setup code. In at least one embodiment, the setup code is a dynamic or static random value. In at least one embodiment, taking the output security verification as an example, the BLE Mesh device outputs the setup code by means of screen display, sound, flashing, vibration, QR code, record in manual, etc.

At Step 1015, the BLE Mesh device calculates a provisioning authorization value. The BLE Mesh device uses the provisioning verification value and the setup code to calculate the provisioning authorization value.

At Step 1016, the provisioner receives an inputted setup code. Usually, provisioner is provided with a user input device such as screen, microphone, and camera. The user can input or confirm the setup code outputted by the BLE Mesh device through the user input device.

At Step 1017, the provisioner calculates a provisioning authorization value. The provisioner uses the provisioning verification value and the setup code transmitted by the IoT cloud platform to calculate the provisioning authorization value.

At Step 1018, the provisioner uses the provisioning authorization value and the provisioning random value generated by the provisioner to calculate a provisioning confirmation value.

At Step 1019, the provisioner transmits the provisioning confirmation value to the BLE Mesh device.

At Step 1020, the BLE Mesh device calculates a provisioning confirmation value using the provisioning authorization value and the provisioning random value generated by the BLE Mesh device.

At Step 1021, the BLE Mesh device transmits the provisioning confirmation value to the provisioner.

At Step 1022, the provisioner transmits the provisioning random value generated by the provisioner to the BLE Mesh device.

At Step 1023, the BLE Mesh device performs security verification.

At Step 1024, the BLE Mesh device transmits the random value generated by the BLE Mesh device to the provisioner.

At Step 1025, the provisioner performs security verification.

At Step 1026, the provisioner transmits provisioning data to the BLE Mesh device. When the security verification succeeds, the provisioner transmits the provisioning data to the BLE Mesh device.

At Step 1027, the BLE Mesh device transmits a provisioning complete message to the provisioner. The provisioning complete message indicates that the BLE Mesh device joins the BLE Mesh networking.

At Step 1028, the link between the BLE Mesh device and the provisioner is disconnected.

It should be noted that, the embodiment of the present disclosure is not limited to any order of the steps in the BLE Mesh device provisioning method. The numbering of the steps in the method embodiments and the accompanying drawings are only for the purpose of description. In practice, the steps can be performed sequentially in any order or in parallel, without departing from the execution logics of the device, and all these are to be encompassed by the scope of the present disclosure.

The apparatus embodiments of the present disclosure will be described. The apparatuses can be configured to perform the method embodiments of the present disclosure. For details not disclosed in the apparatus embodiments of the present disclosure, reference can be made to the method embodiments of the present disclosure.

Figure 11:
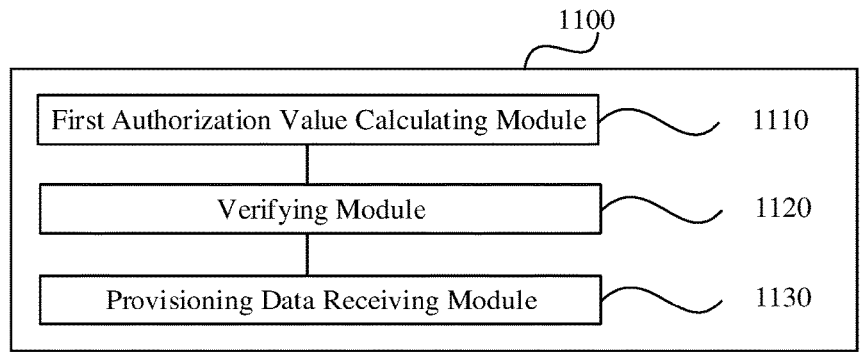
FIG. 11 is a block diagram of a BLE Mesh device provisioning apparatus according to an embodiment of the present disclosure.

Reference is now made to FIG. 11, which shows a block diagram of a BLE Mesh device provisioning apparatus according to an embodiment of the present disclosure. The apparatus has the function of implementing the above method example at the BLE Mesh device, and the function may be implemented by hardware, or by hardware executing corresponding software. The apparatus can be the BLE Mesh device described above, or can be provided in the BLE Mesh device. As shown in FIG. 11, the apparatus 1100 may include: a first authorization value calculating module 1110, a verifying module 1120, and a provisioning data receiving module 1130.

The first authorization value calculating module 1110 is configured to calculate a first provisioning authorization value based on authorization reference information including identification information of the BLE Mesh device.

The verifying module 1120 is configured to perform security verification with a provisioner using the first provisioning authorization value.

The provisioning data receiving module 1130 is configured to receive, when the security verification succeeds, provisioning data from the provisioner, the provisioning data being used for provisioning the BLE Mesh device.

In an example, the first authorization value calculating module may be configured to: obtain a setup code; and process the setup code and the authorization reference information using a first encryption algorithm to obtain the first provisioning authorization value.

In an example, the first authorization value calculating module may be configured to: process the authorization reference information using a second encryption algorithm to obtain a first provisioning verification value; obtain a setup code; and process the first provisioning verification value and the setup code using a third encryption algorithm to obtain the first provisioning authorization value.

In an example, the identification information of the BLE Mesh device may include at least one of: a provisioning random value generated by the BLE Mesh device or a device identifier of the BLE Mesh device.

In an example, the authorization reference information may further include a security credential of the BLE Mesh device.

Figure 12:
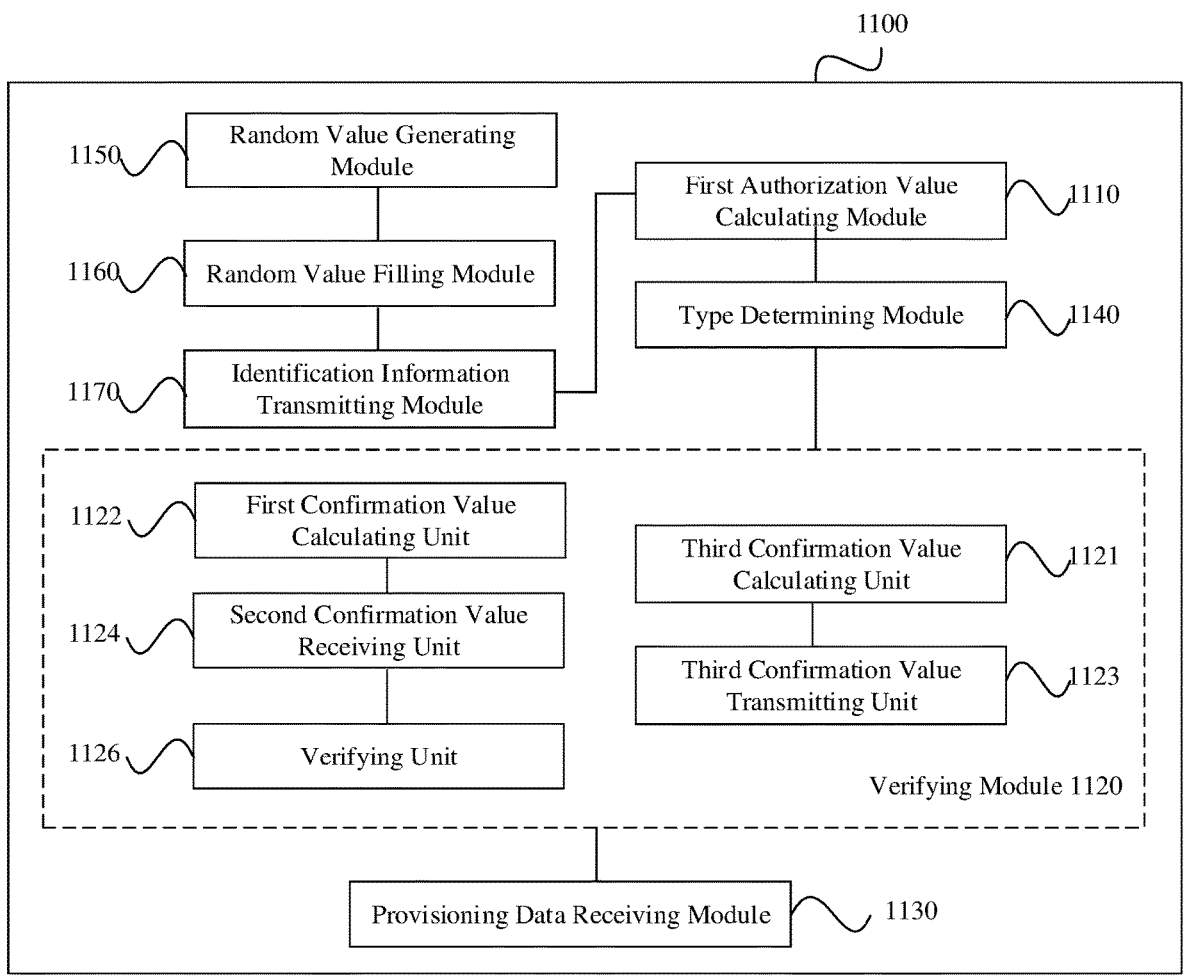
FIG. 12 is a block diagram of a BLE Mesh device provisioning apparatus according to another embodiment of the present disclosure.

In an example, as shown in FIG. 12, the verifying module 1120 may include: a first confirmation value calculating unit 1122 configured to calculate a first provisioning confirmation value based on the first provisioning authorization value; a second confirmation value receiving unit 1124 configured to receive a second provisioning confirmation value from the provisioner; and a verifying unit 1126 configured to perform the security verification with the provisioner based on the first provisioning confirmation value and the second provisioning confirmation value.

In an example, as shown in FIG. 12, the first confirmation value calculating unit 1122 may be configured to: receive a provisioning random value generated by the provisioner; and process the first provisioning authorization value and the provisioning random value generated by the provisioner using a fourth encryption algorithm to obtain the first provisioning confirmation value.

In an example, as shown in FIG. 12, the verifying module 1120 may include: a third confirmation value calculating unit 1121 configured to calculate a third provisioning confirmation value based on the first provisioning authorization value; and a third confirmation value transmitting unit 1123 configured to transmit the third provisioning confirmation value to the provisioner.

In an example, as shown in FIG. 12, the third confirmation value calculating unit 1121 may be configured to: process the first provisioning authorization value and a provisioning random value generated by the BLE Mesh device using a fourth encryption algorithm to obtain the third provisioning confirmation value.

In an example, as shown in FIG. 12, the apparatus 1100 may further include: a type determining module 1140 configured to determine a verification type of the security verification, the verification type of the security verification including input security verification or output security verification. The verifying module 1120 may be configured to perform the security verification with the provisioner according to the verification type.

In an example, as shown in FIG. 12, the type determining module 1140 may be configured to: transmit provisioning capability indication information to the provisioner, the provisioning capability indication information indicating information on the verification type of the security verification supported by the BLE Mesh device; and receive type confirmation information from the provisioner, the type confirmation information indicating the verification type of the security verification.

In an example, as shown in FIG. 12, the type determining module 1140 may be configured to: receive type indication information from the provisioner, the type indication information indicating information on the verification type of the security verification supported by the provisioner; and determine the verification type of the security verification based on first type reference information. The first type reference information includes at least one of: the type indication information, or information on the verification type of the security verification supported by the BLE Mesh device.

In an example, as shown in FIG. 12, the type determining module 1140 may be configured to: receive type confirmation information from the provisioner, the type confirmation information indicating the verification type of the security verification.

In an example, when the verification type of the security verification includes the input security verification, a setup code may be generated by the provisioner; and when the verification type of the security verification includes the output security verification, the setup code may be generated by the BLE Mesh device.

In an example, as shown in FIG. 12, the apparatus 1100 may further include: a random value generating module 1150 configured to generate a provisioning random value for the BLE Mesh device in a provisioning mode; a random value filling module 1160 configured to fill the provisioning random value for the BLE Mesh device in the identification information of the BLE Mesh device; and an identification information transmitting module 1170 configured to transmit the identification information of the BLE Mesh device to the provisioner.

To summarize, with the technical solutions according to the embodiments of the present disclosure, the BLE Mesh device and the provisioner perform security verification according to their respective obtained provisioning authorization values. If the security verification succeeds, the provisioner provisions the BLE Mesh device. In the embodiment of the present disclosure, the provisioning authorization value is calculated based on the identification information of the BLE Mesh device. Since different BLE Mesh devices have different identification information, the identification information of the BLE Mesh device is used as a basis for calculation of the provisioning authorization value, such that different provisioning authorization values can be calculated for different BLE Mesh devices. Compared with the related art where the same provisioning authorization value is used for different BLE Mesh devices, which may cause the problem of wrong binding or invalid binding, the embodiment of the present disclosure strongly associates the provisioning authorization value with the BLE Mesh device, such that for a certain BLE Mesh device, the provisioning authorization value is unique, thereby ensuring proper binding between the BLE Mesh device and its corresponding provisioner. In addition, in the embodiment of the present disclosure, bidirectional verification is used for the security verification, which fully ensures the security of the identities of both parties, and improves the security of the BLE Mesh device and the provisioner.

Figure 13:
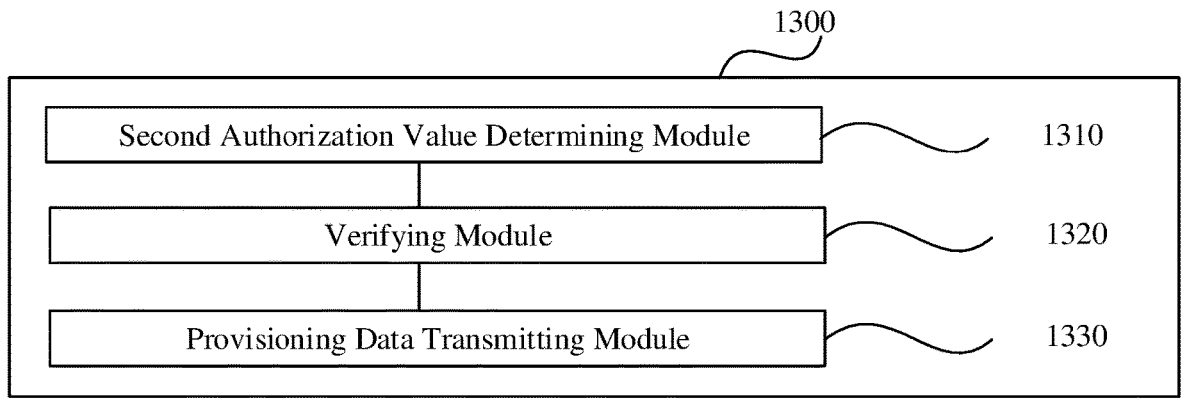
FIG. 13 is a block diagram of a BLE Mesh device provisioning apparatus according to another embodiment of the present disclosure.

Reference is now made to FIG. 13, which shows a block diagram of a BLE Mesh device provisioning apparatus according to an embodiment of the present disclosure. The apparatus has the function of implementing the method example at the provisioner, and the function may be implemented by hardware, or by hardware executing corresponding software. The apparatus may be the provisioner described above, or may be provided in the provisioner. As shown in FIG. 13, the apparatus 1300 may include: a second authorization value determining module 1310, a verifying module 1320, and a provisioning data transmitting module 1330.

The second authorization value determining module 1310 is configured to determine a second provisioning authorization value, the second provisioning authorization value being obtained based on authorization reference information including identification information of a BLE Mesh device.

The verifying module 1320 is configured to perform security verification with the BLE Mesh device using the second provisioning authorization value.

The provisioning data transmitting module 1330 is configured to transmit, when the security verification succeeds, provisioning data to the BLE Mesh device, the provisioning data being used for provisioning the BLE Mesh device.

In an example, the second authorization value determining module 1310 may be configured to: transmit the identification information of the BLE Mesh device to an IoT cloud platform; and receive the second provisioning authorization value from the IoT cloud platform.

Figure 14:
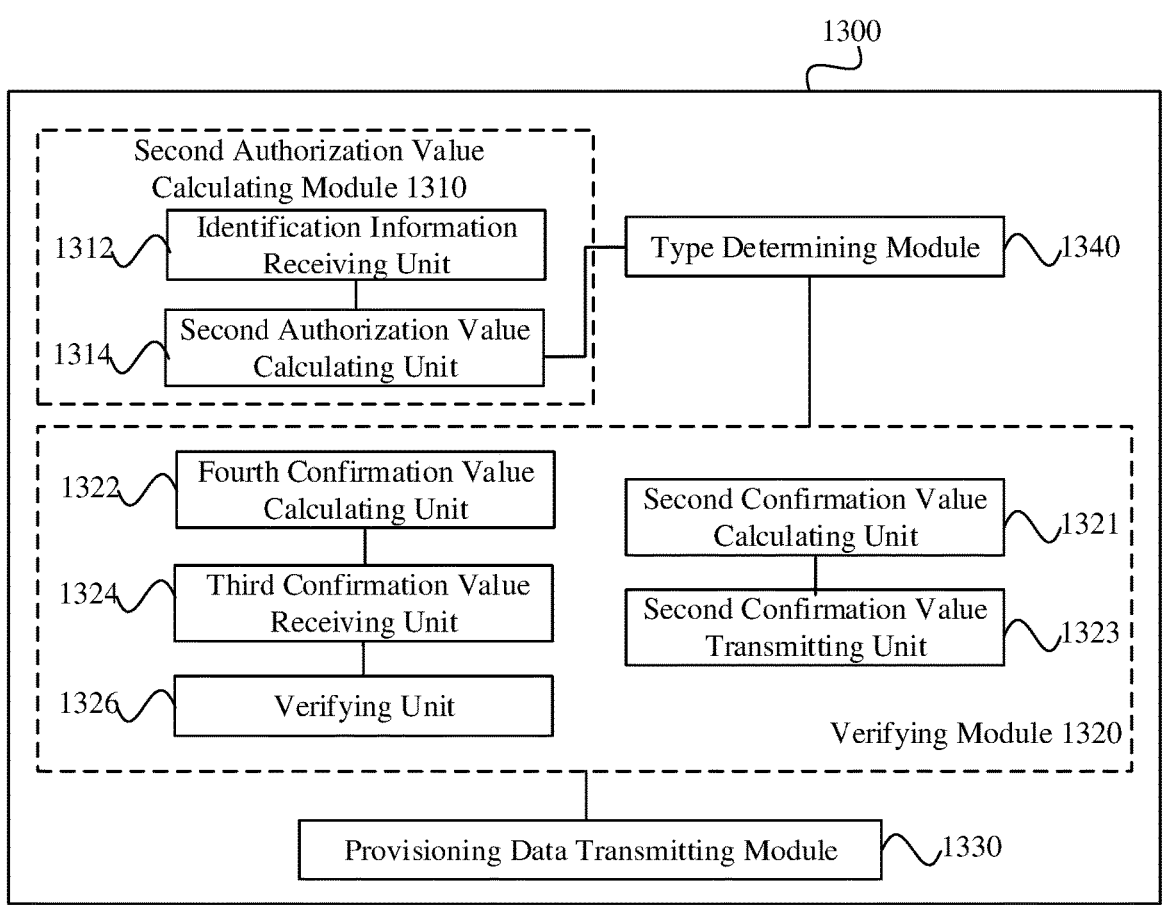
FIG. 14 is a block diagram of a BLE Mesh device provisioning apparatus according to another embodiment of the present disclosure.

In an example, as shown in FIG. 14, the second authorization value determining module 1310 may include: an identification information receiving unit 1312 configured to receive the identification information of the BLE Mesh device; and a second authorization value calculating unit 1314 configured to calculate the second provisioning authorization value based on the authorization reference information.

In an example, the second authorization value calculating unit 1310 may be configured to: transmit the identification information of the BLE Mesh device to an IoT cloud platform; receive a second provisioning verification value from the IoT cloud platform, the second provisioning verification value being obtained based on the identification information of the BLE Mesh device; obtain a setup code; and process the second provisioning verification value and the setup code using a third encryption algorithm to obtain the second provisioning authorization value.

In an example, the identification information of the BLE Mesh device may include at least one of: a provisioning random value generated by the BLE Mesh device or a device identifier of the BLE Mesh device.

In an example, the authorization reference information may further include a security credential of the BLE Mesh device.

In an example, as shown in FIG. 14, the verifying module 1320 may include: a fourth confirmation value calculating unit 1322 configured to calculate a fourth provisioning confirmation value based on the second provisioning authorization value; a third confirmation value receiving unit 1324 configured to receive a third provisioning confirmation value from the BLE Mesh device; and a verifying unit 1326 configured to perform the security verification with the BLE Mesh device based on the fourth provisioning confirmation value and the third provisioning confirmation value.

In an example, the identification information of the BLE Mesh device may include a provisioning random value generated by the BLE Mesh device. As shown in FIG. 14, the fourth confirmation value calculating unit 1322 may be configured to: process the second provisioning authorization value and a random value generated by the BLE Mesh device using a fourth encryption algorithm to obtain the fourth provisioning confirmation value.

In an example, as shown in FIG. 14, the verifying module 1320 may include: a second confirmation value calculating unit 1321 configured to calculate a second provisioning confirmation value based on the second provisioning authorization value; and a second confirmation value transmitting unit 1323 configured to transmit the second provisioning confirmation value to the BLE Mesh device.

In an example, as shown in FIG. 14, the second confirmation value calculating unit 1321 may be configured to: process the second provisioning authorization value and a random value generated by the provisioner using a fourth encryption algorithm to obtain the second provisioning confirmation value.

In an example, as shown in FIG. 14, the apparatus 1300 may further include: a type determining module 1340 configured to determine a verification type of the security verification, the verification type of the security verification including input security verification or output security verification. The verifying module 1320 may be configured to perform the security verification with the BLE Mesh device according to the verification type.

In an example, the type determining module 1340 may be configured to: receive provisioning capability indication information from the BLE Mesh device, the provisioning capability indication information indicating information on the verification type of the security verification supported by the BLE Mesh device; and determine the verification type of the security verification based on second type reference information. The second type reference information may include at least one of: the provisioning capability indication information, or information on the verification type of the security verification supported by the provisioner.

In an example, the apparatus may further perform, subsequent to determining the verification type of the security verification based on the second type reference information: transmitting type confirmation information to the BLE Mesh device, the type confirmation information indicating the verification type of the security verification.

In an example, as shown in FIG. 14, the type determining module 1340 may be configured to: receive type confirmation information from the IoT cloud platform, the type confirmation information indicating the verification type of the security verification.

In an example, when the verification type of the security verification includes the input security verification, a setup code may be generated by the provisioner; and when the verification type of the security verification includes the output security verification, the setup code may be generated by the BLE Mesh device.

To summarize, with the technical solutions according to the embodiments of the present disclosure, the BLE Mesh device and the provisioner perform security verification according to their respective obtained provisioning authorization values. If the security verification succeeds, the provisioner provisions the BLE Mesh device. In the embodiment of the present disclosure, the provisioning authorization value is calculated based on the identification information of the BLE Mesh device. Since different BLE Mesh devices have different identification information, the identification information of the BLE Mesh device is used as a basis for calculation of the provisioning authorization value, such that different provisioning authorization values can be calculated for different BLE Mesh devices. Compared with the related art where the same provisioning authorization value is used for different BLE Mesh devices, which may cause the problem of wrong binding or invalid binding, the embodiment of the present disclosure strongly associates the provisioning authorization value with the BLE Mesh device, such that for a certain BLE Mesh device, the provisioning authorization value is unique, thereby ensuring proper binding between the BLE Mesh device and its corresponding provisioner. In addition, in the embodiment of the present disclosure, bidirectional verification is used for the security verification, which fully ensures the security of the identities of both parties, and improves the security of the BLE Mesh device and the provisioner.

Figure 15:
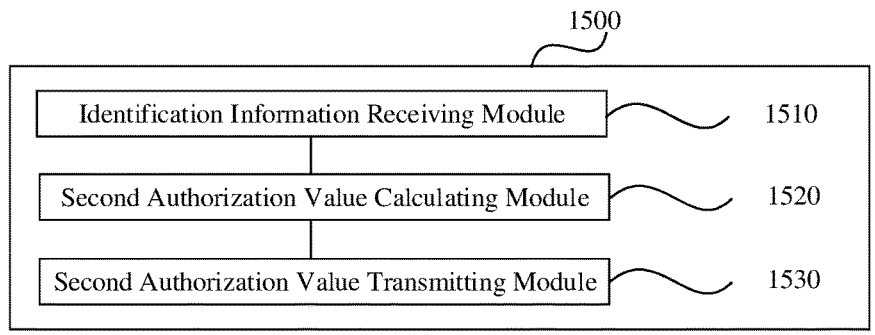
FIG. 15 is a block diagram of a BLE Mesh device provisioning apparatus according to another embodiment of the present disclosure.

Reference is now made to FIG. 15, which shows a block diagram of a BLE Mesh device provisioning apparatus according to an embodiment of the present disclosure. The device has the function of implementing the above method example at the IoT cloud platform, and the function may be implemented by hardware, or by hardware executing corresponding software. The apparatus may be the IoT cloud platform described above, or may be provided in the IoT cloud platform. As shown in FIG. 15, the apparatus 1500 may include: an identification information receiving module 1510, a second authorization value calculating module 1520, and a second authorization value transmitting module 1530.

The identification information receiving module 1510 is configured to receive identification information of a BLE Mesh device.

The second authorization value calculating module 1520 is configured to calculate a second provisioning authorization value based on authorization reference information including the identification information of the BLE Mesh device.

The second authorization value transmitting module 1530 is configured to transmit the second provisioning authorization value to the provisioner, the second provisioning authorization value being used for security verification between the BLE Mesh device and the provisioner.

In an example, the second authorization value calculating module 1520 may be configured to: obtain a setup code; and process the setup code and the authorization reference information using a first encryption algorithm to obtain the second provisioning authorization value.

Figure 16:
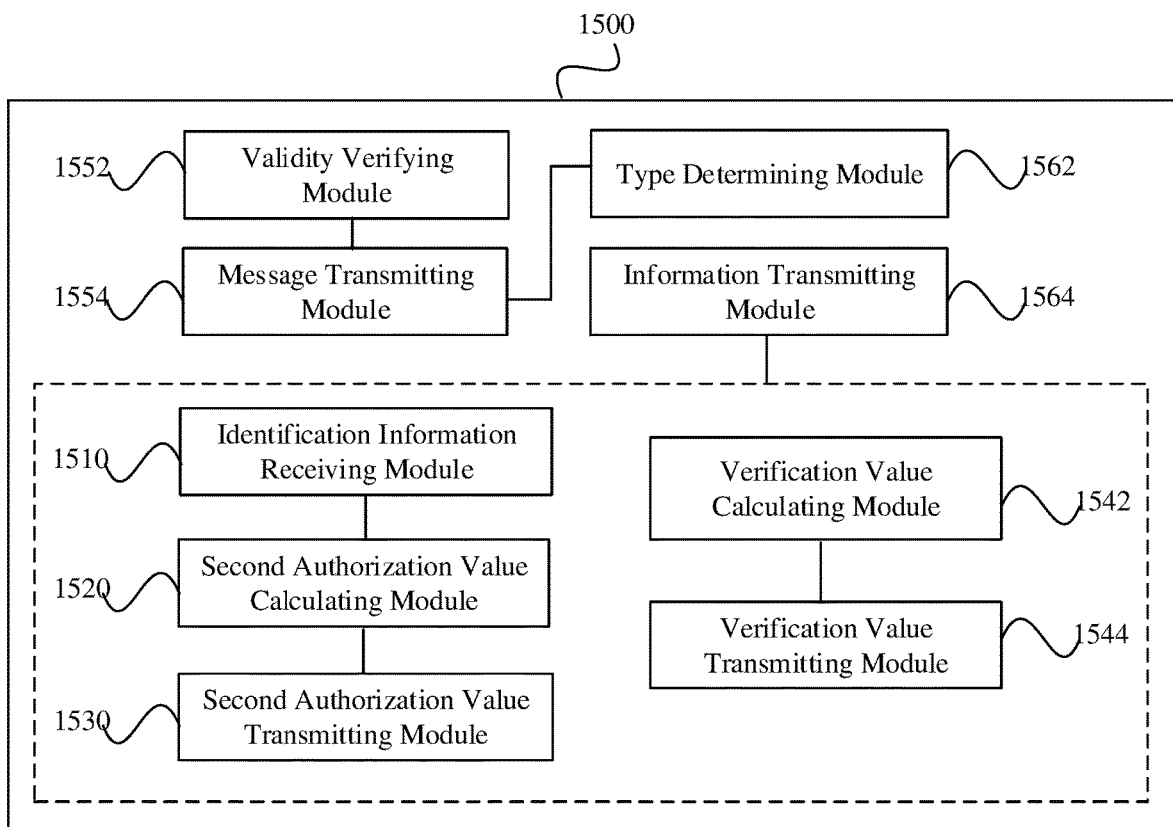
FIG. 16 is a block diagram of a BLE Mesh device provisioning apparatus according to another embodiment of the present disclosure.

In an example, as shown in FIG. 16, the apparatus 1500 may further include: an identification information receiving module 1510 configured to receive the identification information of the BLE Mesh device; a verification value calculating module 1542 configured to process the authorization reference information using a second encryption algorithm to obtain a second provisioning verification value, the authorization reference information including the identification information of the BLE Mesh device; and a verification value transmitting module 1544 configured to transmit the second provisioning verification value to the provisioner.

In an example, the identification information of the BLE Mesh device may include at least one of: a provisioning random value generated by the BLE Mesh device or a device identifier of the BLE Mesh device.

In an example, the authorization reference information may further include a security credential of the BLE Mesh device.

In an example, as shown in FIG. 16, the apparatus 1500 may further include: an identification information receiving module 1510 configured to receive the identification information of the BLE Mesh device; a validity verifying module 1552 configured to perform validity verification on the BLE Mesh device based on the identification information of the BLE Mesh device; and a message transmitting module 1554 configured to transmit a validity confirmation message to the provisioner when the BLE Mesh device passes the validity verification.

In an example, as shown in FIG. 16, the validity verifying module 1552 may be configured to: detect whether a format of the identification information of the BLE Mesh device meets a target format requirement; and determine that the BLE Mesh device passes the validity verification when the format of the identification information of the BLE Mesh device meets the target format requirement.

In an example, the identification information of the BLE Mesh device may include a provisioning random value generated by the BLE Mesh device. The validity verifying module 1552 may be configured to: detect whether the provisioning random value generated by the BLE Mesh device is used for the first time; and determine that the BLE Mesh device passes the validity verification when the provisioning random value generated by the BLE Mesh device is used for the first time.

In an example, as shown in FIG. 16, the apparatus 1500 may further include: a type determining module 1562 configured to determine a verification type of the security verification based on the identification information of the BLE Mesh device, the verification type of the security verification including input security verification or output security verification; and an information transmitting module 1564 configured to transmit type confirmation information to the provisioner, the type confirmation information indicating the verification type of the security verification.

In an example, when the verification type of the security verification includes the input security verification, a setup code may be generated by the provisioner; and when the verification type of the security verification includes the output security verification, the setup code may be generated by the BLE Mesh device.

To summarize, with the technical solutions according to the embodiments of the present disclosure, the BLE Mesh device and the provisioner perform security verification according to their respective obtained provisioning authorization values. If the security verification succeeds, the provisioner provisions the BLE Mesh device. In the embodiment of the present disclosure, the provisioning authorization value is calculated based on the identification information of the BLE Mesh device. Since different BLE Mesh devices have different identification information, the identification information of the BLE Mesh device is used as a basis for calculation of the provisioning authorization value, such that different provisioning authorization values can be calculated for different BLE Mesh devices. Compared with the related art where the same provisioning authorization value is used for different BLE Mesh devices, which may cause the problem of wrong binding or invalid binding, the embodiment of the present disclosure strongly associates the provisioning authorization value with the BLE Mesh device, such that for a certain BLE Mesh device, the provisioning authorization value is unique, thereby ensuring proper binding between the BLE Mesh device and its corresponding provisioner. In addition, in the embodiment of the present disclosure, bidirectional verification is used for the security verification, which fully ensures the security of the identities of both parties, and improves the security of the BLE Mesh device and the provisioner.

It should be noted that, when the apparatus provided in any of the above embodiments achieves its functions, the division of the above functional modules is provided for the purpose of illustration only. In practice, the above functions can be allocated to different functional modules depending on actual requirements. That is, the content/structure of the apparatus can be divided into different functional modules to complete all or part of the functions described above.

Regarding the apparatus in any of the above embodiment, the specific operation of each module has been described in detail in the corresponding method embodiments, and description thereof will be omitted here.

Figure 17:
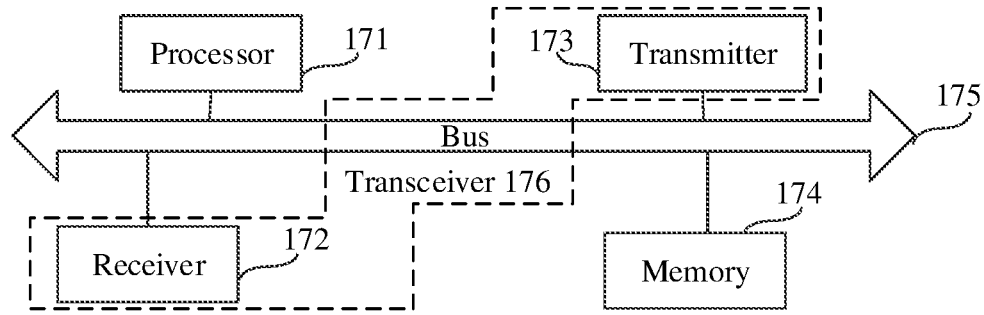
FIG. 17 is a schematic diagram showing a structure of a BLE Mesh device according to an embodiment of the present disclosure.

Reference is now made to FIG. 17, which is a schematic diagram showing a structure of a BLE Mesh device 170 according to an embodiment of the present disclosure. For example, the BLE Mesh device can be configured to perform the above BLE Mesh device provisioning method at the BLE Mesh device. Specifically, the BLE Mesh device 170 may include: a processor 171, a receiver 172, a transmitter 173, a memory 174, and a bus 175.

The processor 171 includes one or more processing cores, and the processor 171 implements various functional applications and information processing by executing a software program and modules.

The receiver 172 and the transmitter 173 may be implemented as a transceiver 176, which may be a communication chip.

The memory 174 is connected to the processor 171 through the bus 175.

The memory 174 has a computer program stored therein, and the processor 171 can be configured to execute the computer program, so as to implement various steps performed by the BLE Mesh device in the above method embodiments.

In addition, the memory 174 can be implemented by any type of volatile or non-volatile storage device or any combination thereof, the volatile or non-volatile storage device including, but not limited to: Random-Access Memory (RAM), Read-Only Memory (ROM), Erasable Programmable Read-Only Memory (EPROM), Electrically Erasable Programmable Read-Only Memory (EEPROM), flash memory or other solid state storage technology, Compact Disc Read-Only Memory (CD-ROM), Digital Video Disc (DVD) or other optical storage, cassette, magnetic tape, magnetic disk storage or other magnetic storage device.

The processor is configured to calculate a first provisioning authorization value based on authorization reference information including identification information of the BLE Mesh device.

The processor is further configured to perform security verification with the provisioner using the first provisioning authorization value.

The transceiver is configured to receive, when the security verification succeeds, provisioning data from the provisioner, the provisioning data being used for provisioning the BLE Mesh device.

In an example, the processor may be further configured to: obtain a setup code; and process the setup code and the authorization reference information using a first encryption algorithm to obtain the first provisioning authorization value.

In an example, the processor may be further configured to: process the authorization reference information using a second encryption algorithm to obtain a first provisioning verification value; obtain a setup code; and process the first provisioning verification value and the setup code using a third encryption algorithm to obtain the first provisioning authorization value.

In an example, the identification information of the BLE Mesh device may include at least one of: a provisioning random value generated by the BLE Mesh device or a device identifier of the BLE Mesh device.

In one example, the authorization reference information may further include a security credential of the BLE Mesh device.

In an example, the processor may be further configured to: calculate a first provisioning confirmation value based on the first provisioning authorization value; receive a second provisioning confirmation value from the provisioner; and perform the security verification with the provisioner based on the first provisioning confirmation value and the second provisioning confirmation value.

In an example, the processor may be further configured to: receive a provisioning random value generated by the provisioner; and process the first provisioning authorization value and the provisioning random value generated by the provisioner using a fourth encryption algorithm to obtain the first provisioning confirmation value.

In an example, the processor may be further configured to calculate a third provisioning confirmation value based on the first provisioning authorization value, and the transceiver may be further configured to transmit the third provisioning confirmation value to the provisioner.

In an example, the processor may be further configured to: process the first provisioning authorization value and a provisioning random value generated by the BLE Mesh device using a fourth encryption algorithm to obtain the third provisioning confirmation value.

In an example, the processor may be further configured to: determine a verification type of the security verification, the verification type of the security verification including input security verification or output security verification; and perform the security verification with the provisioner according to the verification type.

In an example, the transceiver may be further configured to: transmit provisioning capability indication information to the provisioner, the provisioning capability indication information indicating information on the verification type of the security verification supported by the BLE Mesh device; and receive type confirmation information from the provisioner, the type confirmation information indicating the verification type of the security verification.

In an example, the transceiver may be further configured to receive type indication information from the provisioner, the type indication information indicating information on the verification type of the security verification supported by the provisioner. The processor may be further configured to determine the verification type of the security verification based on first type reference information. The first type reference information may include at least one of: the type indication information, or information on the verification type of the security verification supported by the BLE Mesh device.

In an example, the transceiver may be further configured to receive type confirmation information from the provisioner, the type confirmation information indicating the verification type of the security verification.

In an example, when the verification type of the security verification includes the input security verification, a setup code may be generated by the provisioner; and when the verification type of the security verification includes the output security verification, the setup code may be generated by the BLE Mesh device.

In an example, the processor may be further configured to generate a provisioning random value for the BLE Mesh device in a provisioning mode, and fill the provisioning random value for the BLE Mesh device in the identification information of the BLE Mesh device. The transceiver may be further configured to transmit the identification information of the BLE Mesh device to the provisioner.

Figure 18:
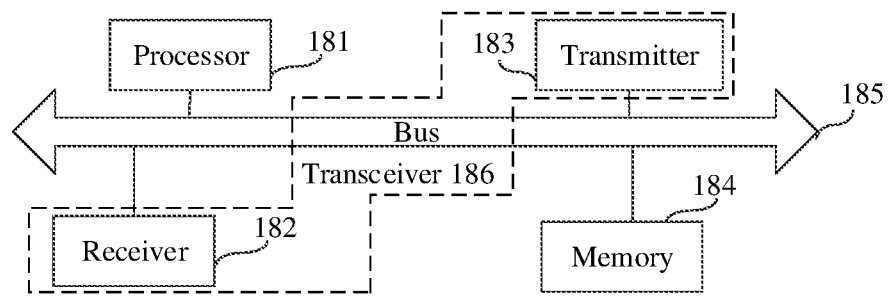
FIG. 18 is a schematic diagram showing a structure of a provisioner according to an embodiment of the present disclosure.

Reference is now made to FIG. 18, which is a schematic diagram showing a structure of a provisioner 180 according to an embodiment of the present disclosure. For example, the provisioner can be configured to perform the above BLE Mesh device provisioning method at the provisioner. Specifically, the provisioner 180 may include: a processor 181, a receiver 182, a transmitter 183, a memory 184, and a bus 185.

The processor 181 includes one or more processing cores, and the processor 181 implements various functional applications and information processing by executing a software program and modules.

The receiver 182 and the transmitter 183 may be implemented as a transceiver 186, which may be a communication chip.

The memory 184 is connected to the processor 181 through the bus 185.

The memory 184 has a computer program stored therein, and the processor 181 can be configured to execute the computer program, so as to implement various steps performed by the provisioner in the above method embodiments.

In addition, the memory 184 can be implemented by any type of volatile or non-volatile storage device or any combination thereof, the volatile or non-volatile storage device including, but not limited to: Random-Access Memory (RAM), Read-Only Memory (ROM), Erasable Programmable Read-Only Memory (EPROM), Electrically Erasable Programmable Read-Only Memory (EEPROM), flash memory or other solid state storage technology, Compact Disc Read-Only Memory (CD-ROM), Digital Video Disc (DVD) or other optical storage, cassette, magnetic tape, magnetic disk storage or other magnetic storage device.

The processor is configured to determine a second provisioning authorization value, the second provisioning authorization value being obtained based on authorization reference information including identification information of a BLE Mesh device.

The processor is further configured to perform security verification with the BLE Mesh device using the second provisioning authorization value.

The transceiver is configured to transmit, when the security verification succeeds, provisioning data to the BLE Mesh device, the provisioning data being used for provisioning the BLE Mesh device.

In an example, the transceiver may be further configured to: transmit the identification information of the BLE Mesh device to an IoT cloud platform; and receive the second provisioning authorization value from the IoT cloud platform.

In an example, the transceiver may be further configured to receive identification information of the BLE Mesh device, and the processor may be further configured to calculate the second provisioning authorization value based on the authorization reference information.

In an example, the transceiver may be further configured to transmit the identification information of the BLE Mesh device to an IoT cloud platform; and receive a second provisioning verification value from the IoT cloud platform, the second provisioning verification value being obtained based on the identification information of the BLE Mesh device. The processor may be further configured to obtain a setup code; and process the second provisioning verification value and the setup code using a third encryption algorithm to obtain the second provisioning authorization value.

In an example, the identification information of the BLE Mesh device may include at least one of: a provisioning random value generated by the BLE Mesh device or a device identifier of the BLE Mesh device.

In an example, the authorization reference information may further include a security credential of the BLE Mesh device.

In an example, the processor may be further configured to calculate a fourth provisioning confirmation value based on the second provisioning authorization value. The transceiver may be further configured to receive a third provisioning confirmation value from the BLE Mesh device. The processor may be further configured to perform the security verification with the BLE Mesh device based on the fourth provisioning confirmation value and the third provisioning confirmation value.

In an example, the identification information of the BLE Mesh device may include a provisioning random value generated by the BLE Mesh device. The processor may be further configured to process the second provisioning authorization value and the random value generated by the BLE Mesh device using a fourth encryption algorithm to obtain the fourth provisioning confirmation value.

In an example, the processor may be further configured to: calculate a second provisioning confirmation value based on the second provisioning authorization value; and transmit the second provisioning confirmation value to the BLE Mesh device.

In an example, the processor may be further configured to: process the second provisioning authorization value and a random value generated by the provisioner using a fourth encryption algorithm to obtain the second provisioning confirmation value.

In an example, the processor may be further configured to: determine a verification type of the security verification, the verification type of the security verification including input security verification or output security verification; and perform the security verification with the BLE Mesh device according to the verification type.

In an example, the transceiver may be further configured to receive provisioning capability indication information from the BLE Mesh device, the provisioning capability indication information indicating information on the verification type of the security verification supported by the BLE Mesh device. The processor may be further configured to determine the verification type of the security verification based on second type reference information. The second type reference information may include at least one of: the provisioning capability indication information, or information on the verification type of the security verification supported by the provisioner.

In an example, the transceiver may be further configured to: transmit type confirmation information to the BLE Mesh device, the type confirmation information indicating the verification type of the security verification.

In an example, the transceiver may be further configured to: receive type confirmation information from the IoT cloud platform, the type confirmation information indicating the verification type of the security verification.

In an example, when the verification type of the security verification includes the input security verification, a setup code may be generated by the provisioner; and when the verification type of the security verification includes the output security verification, the setup code may be generated by the BLE Mesh device.

Figure 19:
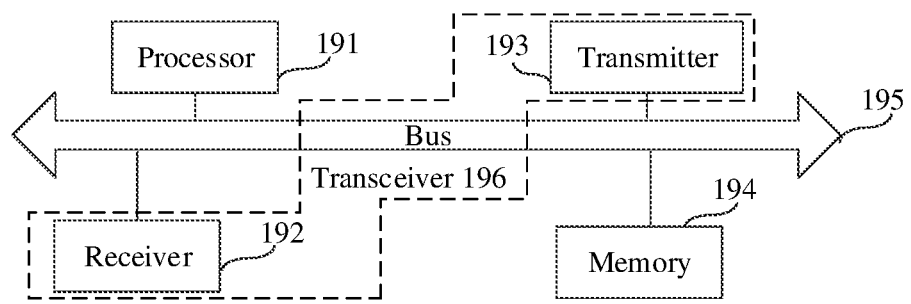
FIG. 19 is a schematic diagram showing a structure of an IoT cloud platform according to an embodiment of the present disclosure.

Reference is now made to FIG. 19, which is a schematic diagram showing a structure of an IoT cloud platform 190 according to an embodiment of the present disclosure. For example, the IoT cloud platform can be configured to perform the above BLE Mesh device provisioning method at the IoT cloud platform. Specifically, the IoT cloud platform 190 may include: a processor 191, a receiver 192, a transmitter 193, a memory 194, and a bus 195.

The processor 191 includes one or more processing cores, and the processor 191 implements various functional applications and information processing by executing a software program and modules.

The receiver 192 and the transmitter 193 may be implemented as a transceiver 196, which may be a communication chip.

The memory 194 is connected to the processor 191 through the bus 195.

The memory 194 has a computer program stored therein, and the processor 191 can be configured the computer program, so as to implement various steps performed by the IoT cloud platform in the above method embodiments.

In addition, the memory 194 can be implemented by any type of volatile or non-volatile storage device or any combination thereof, the volatile or non-volatile storage device including, but not limited to: Random-Access Memory (RAM), Read-Only Memory (ROM), Erasable Programmable Read-Only Memory (EPROM), Electrically Erasable Programmable Read-Only Memory (EEPROM), flash memory or other solid state storage technology, Compact Disc Read-Only Memory (CD-ROM), Digital Video Disc (DVD) or other optical storage, cassette, magnetic tape, magnetic disk storage or other magnetic storage device.

The transceiver is configured to receive identification information of a BLE Mesh device.

The processor is configured to calculate a second provisioning authorization value based on authorization reference information including the identification information of the BLE Mesh device.

The transceiver is configured to transmit the second provisioning authorization value to the provisioner, the second provisioning authorization value being used for security verification between the BLE Mesh device and the provisioner.

In an example, the transceiver may be configured to receive identification information of a BLE Mesh device. The processor may be configured to calculate a second provisioning authorization value based on authorization reference information including the identification information of the BLE Mesh device. The transceiver may be configured to transmit the second provisioning authorization value to the provisioner, the second provisioning authorization value being used for security verification between the BLE Mesh device and the provisioner.

In an example, the transceiver may be further configured to: obtain a setup code; and process the setup code and the authorization reference information using a first encryption algorithm to obtain the second provisioning authorization value.

In an example, the transceiver may be further configured to receive the identification information of the BLE Mesh device. The processor may be further configured to process the authorization reference information using a second encryption algorithm to obtain a second provisioning verification value, the authorization reference information including the identification information of the BLE Mesh device. The transceiver may be further configured to transmit the second provisioning verification value to the provisioner.

In an example, the identification information of the BLE Mesh device may include at least one of: a provisioning random value generated by the BLE Mesh device or a device identifier of the BLE Mesh device.

In an example, the authorization reference information may further include a security credential of the BLE Mesh device.

In an example, the transceiver may be further configured to receive the identification information of the BLE Mesh device. The processor may be further configured to perform validity verification on the BLE Mesh device based on the identification information of the BLE Mesh device. The transceiver may be further configured to transmit a validity confirmation message to the provisioner when the BLE Mesh device passes the validity verification.

In an example, the processor may be further configured to: detect whether a format of the identification information of the BLE Mesh device meets a target format requirement; and determine that the BLE Mesh device passes the validity verification when the format of the identification information of the BLE Mesh device meets the target format requirement.

In an example, the identification information of the BLE Mesh device may include a provisioning random value generated by the BLE Mesh device. The processor may be further configured to: detect whether the provisioning random value generated by the BLE Mesh device is used for the first time; and determine that the BLE Mesh device passes the validity verification when the provisioning random value generated by the BLE Mesh device is used for the first time.

In an example, the processor may be further configured to determine a verification type of the security verification based on the identification information of the BLE Mesh device, the verification type of the security verification including input security verification or output security verification. The transceiver may be further configured to transmit type confirmation information to the provisioner, the type confirmation information indicating the verification type of the security verification.

In an example, when the verification type of the security verification includes the input security verification, a setup code may be generated by the provisioner; and when the verification type of the security verification includes the output security verification, the setup code may be generated by the BLE Mesh device.

An embodiment of the present disclosure further provides a computer-readable storage medium. The computer-readable storage medium has a computer program stored therein. The computer program is configured to be executed by a processor in a BLE Mesh device, so as to perform the above BLE Mesh device provisioning method at the terminal device.

An embodiment of the present disclosure further provides a computer-readable storage medium. The computer-readable storage medium has a computer program stored therein. The computer program is configured to be executed by a processor in a provisioner, so as to perform the above BLE Mesh device provisioning method at the provisioner.

An embodiment of the present disclosure further provides a computer-readable storage medium. The computer-readable storage medium has a computer program stored therein. The computer program is configured to be executed by a processor in an IoT cloud platform, so as to perform the above BLE Mesh device provisioning method at the IoT cloud platform.

An embodiment of the present disclosure further provides a chip. The chip includes a programmable logic circuit and/or program instructions. When the chip runs on a BLE Mesh device, it is configured to implement the above BLE Mesh device provisioning method at the BLE Mesh device.

An embodiment of the present disclosure further provides a chip. The chip includes a programmable logic circuit and/or program instructions. When the chip runs on a provisioner, it is configured to implement the above BLE Mesh device provisioning method at the provisioner.

An embodiment of the present disclosure further provides a chip. The chip includes a programmable logic circuit and/or program instructions. When the chip runs on an IoT cloud platform, it is configured to implement the above BLE Mesh device provisioning method at the IoT cloud platform.

The present disclosure further provides a computer program product. When the computer program product runs on a BLE Mesh device, it enables a computer to perform the above BLE Mesh device provisioning method at the BLE Mesh device.

The present disclosure further provides a computer program product. When the computer program product runs on a provisioner, it enables a computer to perform the above BLE Mesh device provisioning method at the provisioner.

The present disclosure further provides a computer program product. When the computer program product runs on an IoT cloud platform, it enables a computer to perform the above BLE Mesh device provisioning method at the IoT cloud platform.

It can be appreciated by those skilled in the art that, in one or more of the above examples, the functions described in the embodiments of the present disclosure may be implemented by hardware, software, firmware, or any combination thereof. When implemented by software, the functions may be stored in a computer-readable medium or transmitted as one or more instructions or codes on a computer-readable medium. The computer-readable medium includes a computer storage medium and a communication medium. The communication medium includes any medium that facilitates transfer of a computer program from one place to another. The storage medium can be any available medium that can be accessed by a general purpose or special purpose computer.

While the preferred embodiments of the present disclosure have been described above, they are not intended to limit the present disclosure. Any modifications, equivalents, or improvements that can be made within the spirit and principle of the present disclosure are to be encompassed by the scope of the present disclosure.

What is claimed is:

1. A Bluetooth Low Energy (BLE) mesh network (Mesh) device provisioning method, applied in a BLE Mesh device, the method comprising:
   calculating a first provisioning authorization value based on authorization reference information comprising identification information of the BLE Mesh device, wherein the identification information of the BLE Mesh device comprises at least one of: a provisioning random value generated by the BLE Mesh device or a device identifier of the BLE Mesh device;
   performing security verification with a provisioner using the first provisioning authorization value; and
   receiving, when the security verification succeeds, provisioning data from the provisioner, the provisioning data being used for provisioning the BLE Mesh device;
   wherein calculating the first provisioning authorization value based on the authorization reference information, comprises:
   obtaining a setup code; and processing the setup code and the authorization reference information using an encryption algorithm to obtain the first provisioning authorization value; and performing the security verification with the provisioner using the first provisioning authorization value, comprises:

calculating a third provisioning confirmation value based on the first provisioning authorization value; and transmitting the third provisioning confirmation value to the provisioner, the third provisioning confirmation value being used for verifying an identity of the BLE Mesh device.

2. The method according to claim 1, wherein processing the setup code and the authorization reference information using the encryption algorithm to obtain the first provisioning authorization value, comprises:

processing the setup code and the authorization reference information using a first encryption algorithm to obtain the first provisioning authorization value.

3. The method according to claim 1, wherein processing the setup code and the authorization reference information using the encryption algorithm to obtain the first provisioning authorization value, comprises:

processing the authorization reference information using a second encryption algorithm to obtain a first provisioning verification value; and processing the first provisioning verification value and the setup code using a third encryption algorithm to obtain the first provisioning authorization value.

4. The method according to claim 1, wherein performing the security verification with the provisioner using the first provisioning authorization value, further comprises:

calculating a first provisioning confirmation value based on the first provisioning authorization value;

receiving a second provisioning confirmation value from the provisioner; and performing the security verification with the provisioner based on the first provisioning confirmation value and the second provisioning confirmation value.

5. The method according to claim 4, wherein calculating the first provisioning confirmation value based on the first provisioning authorization value, comprises:

receiving a provisioning random value generated by the provisioner; and processing the first provisioning authorization value and the provisioning random value generated by the provisioner using a fourth encryption algorithm to obtain the first provisioning confirmation value.

6. The method according to claim 1, wherein calculating the third provisioning confirmation value based on the first provisioning authorization value, comprises:

processing the first provisioning authorization value and the provisioning random value generated by the BLE Mesh device using a fourth encryption algorithm to obtain the third provisioning confirmation value.

7. The method according to claim 1, further comprising:
determining a verification type of the security verification, the verification type of the security verification comprising input security verification or output security verification; and performing the security verification with the provisioner according to the verification type.

8. A provisioner, comprising a memory storing a computer program, a processor and a transceiver connected to the processor; wherein the computer program stored in the memory that, when executed by the processor, causes the processor of the provisioner to perform the steps of:

determining a second provisioning authorization value, the second provisioning authorization value being obtained based on authorization reference information comprising identification information of a Bluetooth Low Energy (BLE) mesh network (Mesh) device, wherein the identification information of the BLE Mesh device comprises at least one of: a provisioning random value generated by the BLE Mesh device or a device identifier of the BLE Mesh device;

performing security verification with the BLE Mesh device using the second provisioning authorization value;

controlling, the transceiver to transmit, when the security verification succeeds, provisioning data to the BLE Mesh device, the provisioning data being used for provisioning the BLE Mesh device;

calculating a fourth provisioning confirmation value based on the second provisioning authorization value;

controlling, the transceiver to receive a third provisioning confirmation value from the BLE Mesh device; and performing the security verification with the BLE Mesh device based on the fourth provisioning confirmation value and the third provisioning confirmation value, wherein the security verification succeeds when the fourth provisioning confirmation value is equal to the third provisioning confirmation value;

wherein determining the second provisioning authorization value, comprises:

controlling, the transceiver to receive the second provisioning authorization value from an Internet of Things (IoT) cloud platform; or controlling, the transceiver to receive a second provisioning verification value from the IoT cloud platform, obtaining a setup code, and processing the authorization reference information and the setup code using an encryption algorithm to obtain the second provisioning authorization value.

9. The provisioner according to claim 8, wherein controlling, the transceiver to receive the second provisioning authorization value from the IoT cloud platform, comprises:

controlling, the transceiver to transmit the identification information of the BLE Mesh device to the IoT cloud platform, and receive the second provisioning authorization value from the IoT cloud platform.

10. The provisioner according to claim 8, wherein the computer program stored in the memory that, when executed by the processor, causes the processor of the provisioner further to perform:

controlling, the transceiver to receive the identification information of the BLE Mesh device; and calculating the second provisioning authorization value based on the authorization reference information.

11. The provisioner according to claim 8, wherein the computer program stored in the memory that, when executed by the processor, causes the processor of the provisioner to perform:

controlling, the transceiver to transmit the identification information of the BLE Mesh device to the IoT cloud platform, and receive the second provisioning verification value from the IoT cloud platform, the second provisioning verification value being obtained based on the identification information of the BLE Mesh device;

obtaining the setup code, and processing the second provisioning verification value and the setup code using a third encryption algorithm to obtain the second provisioning authorization value.

12. The provisioner according to claim 8, wherein calculating the fourth provisioning confirmation value based on the second provisioning authorization value, comprises:
processing the second provisioning authorization value and the random value generated by the BLE Mesh device using a fourth encryption algorithm to obtain the fourth provisioning confirmation value.

13. The provisioner according to claim 8, wherein the computer program stored in the memory that, when executed by the processor, causes the processor of the provisioner to perform:
calculating a second provisioning confirmation value based on the second provisioning authorization value; and
controlling, the transceiver to transmit the second provisioning confirmation value to the BLE Mesh device.

14. The provisioner according to claim 13, wherein the computer program stored in the memory that, when executed by the processor, causes the processor of the provisioner further to perform:
processing the second provisioning authorization value and a random value generated by the provisioner using a fourth encryption algorithm to obtain the second provisioning confirmation value.

15. The provisioner according to claim 8, wherein the computer program stored in the memory that, when executed by the processor, causes the processor of the provisioner further to perform the steps of:
determining a verification type of the security verification, the verification type of the security verification comprising input security verification or output security verification; and
performing the security verification with the BLE Mesh device according to the verification type.

16. An Internet of Things (IoT) cloud platform, comprising a memory storing a computer program, a processor and a transceiver connected to the processor; wherein the computer program stored in the memory that, when executed by the processor, causes the processor of the IoT cloud platform to perform the steps of:
controlling, the transceiver to receive identification information of a Bluetooth Low Energy (BLE) mesh network (Mesh) device, the identification information of the BLE Mesh device comprising at least one of: a provisioning random value generated by the BLE Mesh device or a device identifier of the BLE Mesh device;
calculating a second provisioning authorization value based on authorization reference information comprising the identification information of the BLE Mesh device; and
controlling, the transceiver to transmit the second provisioning authorization value to the provisioner, the second provisioning authorization value being used for security verification between the BLE Mesh device and the provisioner;
determining a verification type of the security verification based on the identification information of the BLE Mesh device, the verification type of the security verification comprising input security verification or output security verification; and
controlling, the transceiver to transmit type confirmation information to the provisioner, the type confirmation information indicating the verification type of the security verification;
wherein calculating the second provisioning authorization value based on the authorization reference information comprising the identification information of the BLE Mesh device, comprises:
controlling, the transceiver to transmit a second provisioning verification value to the provisioner, the second provisioning verification value being used for the provisioner to determine the second provisioning authorization value; or
obtaining a setup code, and processing the authorization reference information and the setup code using an encryption algorithm to obtain the second provisioning authorization value.

17. The IoT cloud platform according to claim 16, wherein processing the authorization reference information and the setup code using the encryption algorithm to obtain the second provisioning authorization value, comprises:
processing the setup code and the authorization reference information using a first encryption algorithm to obtain the second provisioning authorization value.

18. The IoT cloud platform according to claim 16, wherein controlling, the transceiver to transmit the second provisioning verification value to the provisioner, comprises:
controlling, the transceiver to receive the identification information of the BLE Mesh device;
processing the authorization reference information using a second encryption algorithm to obtain the second provisioning verification value, the authorization reference information comprising the identification information of the BLE Mesh device; and
controlling, the transceiver to transmit the second provisioning verification value to the provisioner.

* * * * *